(12) United States Patent
Hashida et al.

(10) Patent No.: US 10,232,302 B2
(45) Date of Patent: Mar. 19, 2019

(54) GAS-ADSORBING DEVICE AND EVACUATED INSULATING MATERIAL USING SAME

(71) Applicant: Panasonic Intellectual Property Management Co., Ltd., Osaka-shi, Osaka (JP)

(72) Inventors: Masamichi Hashida, Shiga (JP); Risa Taniguchi, Kyoto (JP); Naoki Yamamoto, Osaka (JP)

(73) Assignee: Panasonic Intellectual Property Management Co., Ltd.

( * ) Notice: Subject to any disclaimer, the term of this patent is extended or adjusted under 35 U.S.C. 154(b) by 127 days.

(21) Appl. No.: 15/122,367

(22) PCT Filed: Jun. 24, 2015

(86) PCT No.: PCT/JP2015/003170
§ 371 (c)(1),
(2) Date: Aug. 29, 2016

(87) PCT Pub. No.: WO2015/198596
PCT Pub. Date: Dec. 30, 2015

(65) Prior Publication Data
US 2016/0367934 A1    Dec. 22, 2016

(30) Foreign Application Priority Data

Jun. 24, 2014 (JP) .................................. 2014-128745
Jun. 24, 2014 (JP) .................................. 2014-128747

(51) Int. Cl.
*B01D 53/04* (2006.01)
*F16L 59/065* (2006.01)
(Continued)

(52) U.S. Cl.
CPC ..... *B01D 53/0446* (2013.01); *B01D 53/0415* (2013.01); *B01D 53/261* (2013.01);
(Continued)

(58) Field of Classification Search
CPC ............... F16L 59/065; B01D 53/0446; B01D 53/0415; B01D 53/261; B01D 53/0407;
(Continued)

(56) References Cited

U.S. PATENT DOCUMENTS 3,737,709 A * 6/1973 Hornman ................. H01J 7/186
313/561
5,328,336 A * 7/1994 Nowobilski ............ F04B 37/04
417/48
(Continued)

FOREIGN PATENT DOCUMENTS

DE    2500340 A1 * 7/1975 ............. H01J 7/186
EP    0138534 A1 * 4/1985 ............. H01J 7/186
(Continued)

OTHER PUBLICATIONS

"Thermoplastic" Wikipedia published Jun. 23, 2013 accessed at <https://en.wikipedia.org/w/index.php?title=Thermoplastic&oldid=561265936> (Year: 2013).*
(Continued)

*Primary Examiner* — Stephen Hobson
(74) *Attorney, Agent, or Firm* — Hamre, Schumann, Mueller & Larson, P.C.

(57) ABSTRACT

A gas-adsorbing device (1) includes: a container (2); a gas adsorbent (3) configured to be disposed inside the container (2) so as to adsorb a gas; and an aeration member (4) having a predetermined aeration rate. The gas adsorbent (3) is disposed in a space formed by the container (2) and the aeration member (4). Further, the space is configured to be completely enclosed by the container (2) and the aeration
(Continued)

member (4). In this configuration, it is possible to attain a gas-adsorbing device in which it is possible to reduce consumption of the gas adsorbent due to contact with air, even when the gas-adsorbing device is handled in air.

15 Claims, 9 Drawing Sheets

(51) Int. Cl.
*B01D 53/26* (2006.01)
*H01J 7/18* (2006.01)

(52) U.S. Cl.
CPC ........ *F16L 59/065* (2013.01); *B01D 53/0407* (2013.01); *B01D 2253/108* (2013.01); *B01D 2253/1122* (2013.01); *B01D 2253/25* (2013.01); *B01D 2257/102* (2013.01); *B01D 2257/80* (2013.01); *B01D 2259/45* (2013.01); *H01J 7/18* (2013.01); *H01J 7/183* (2013.01); *H01J 7/186* (2013.01)

(58) Field of Classification Search
CPC ........ B01D 2257/80; B01D 2253/1122; B01D 2253/108; B01D 2257/102; B01D 2259/45; B01D 2253/25; H01J 7/186; H01J 7/183; H01J 7/18
See application file for complete search history.

(56) References Cited

U.S. PATENT DOCUMENTS

| | | | | |
|---|---|---|---|---|
| 5,505,810 A * | 4/1996 | Kirby | ................ | B32B 27/00 156/286 |
| 5,544,490 A * | 8/1996 | Manini | ................ | A47J 41/022 252/181.1 |
| 5,600,957 A | 2/1997 | Manini et al. | | |
| 6,200,494 B1 * | 3/2001 | Manini | ................ | B01J 20/06 252/181.2 |
| 6,842,473 B2 * | 1/2005 | Porta | ................ | H01L 23/26 252/181.7 |
| 6,873,102 B2 * | 3/2005 | Martelli | ................ | H01J 7/183 313/553 |
| 9,228,340 B2 * | 1/2016 | Min | ................ | F16L 59/065 |
| 9,556,998 B2 * | 1/2017 | Yuasa | ................ | B01J 20/186 |
| 9,901,900 B2 * | 2/2018 | Sato | ................ | B01J 20/186 |
| 2009/0090242 A1 * | 4/2009 | Hashida | ................ | F16L 59/065 95/101 |
| 2012/0006195 A1 * | 1/2012 | Hashida | ................ | A47J 41/028 95/90 |
| 2013/0160652 A1 * | 6/2013 | Yuasa | ................ | B01D 53/261 96/153 |
| 2013/0175716 A1 * | 7/2013 | Weisshaar | ................ | B01F 15/0085 261/124 |
| 2013/0305928 A1 * | 11/2013 | Kojima | ................ | B01D 53/0407 96/108 |
| 2013/0306655 A1 * | 11/2013 | Takushima | ................ | B01D 53/0407 220/592.25 |
| 2014/0037119 A1 * | 2/2014 | Yuasa | ................ | H04R 1/02 381/346 |
| 2014/0178613 A1 * | 6/2014 | Koshiyama | ................ | F16L 59/065 428/34.6 |
| 2016/0121259 A1 * | 5/2016 | Sugito | ................ | B01D 53/0415 96/153 |
| 2016/0136612 A1 * | 5/2016 | Sato | ................ | B01J 20/186 428/446 |
| 2017/0082236 A1 * | 3/2017 | Yuasa | ................ | B01D 53/261 |
| 2018/0171604 A1 * | 6/2018 | Kim | ................ | B01D 53/261 |

FOREIGN PATENT DOCUMENTS

| | | | | |
|---|---|---|---|---|
| EP | 0853328 A1 * | 7/1998 | ............. | H01J 7/186 |
| GB | 934983 A * | 8/1963 | ............. | H01J 7/18 |
| GB | 951470 A * | 3/1964 | ............. | H01J 7/186 |
| GB | 1186581 A * | 4/1970 | ............. | H01J 7/186 |
| JP | 9-512088 | 12/1997 | | |
| JP | 2008-056317 | 3/2008 | | |
| JP | 2008-249003 | 10/2008 | | |
| JP | 2008249003 | * 10/2008 | | |
| JP | 2009-078261 | 4/2009 | | |
| JP | 2009078261 | * 4/2009 | | |
| JP | 2010-260557 | 11/2010 | | |
| JP | 2011-183367 | 9/2011 | | |
| WO | WO-8910627 A1 * | 11/1989 | ............. | H01J 7/186 |
| WO | WO-9106113 A1 * | 5/1991 | ............. | H01J 7/186 |
| WO | WO-9750107 A1 * | 12/1997 | ............. | H01J 7/186 |
| WO | WO-0028568 A1 * | 5/2000 | ............. | H01J 7/186 |
| WO | WO-2005124812 A1 * | 12/2005 | ............. | H01J 7/186 |
| WO | WO-2006080091 A1 * | 8/2006 | ........ | B01J 20/3035 |
| WO | WO-2007053441 A2 * | 5/2007 | ............. | H01J 7/18 |
| WO | WO-2012098896 A1 * | 7/2012 | ............. | F16L 59/065 |

OTHER PUBLICATIONS

EPO translation of Masamichi JP 2009078261 published Apr. 16, 2009 (Year: 2009).*
EPO translation of Diagoro JP 2008249003 published Oct. 16, 2008 (Year: 2008).*

* cited by examiner

FIG. 6

| | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|
| AERATION MEMBER | GLASS-POWDER SINTERED BODY | GLASS-POWDER SINTERED BODY | GLASS-POWDER SINTERED BODY | GLASS-POWDER SINTERED BODY | GLASS-POWDER SINTERED BODY | FILLING COPPER PIPE WITH GLASS POWDER | FILLING COPPER PIPE WITH GLASS POWDER |
| JOINING MATERIAL | NO USE | NO USE | LOW-MELTING-POINT GLASS | LOW-MELTING-POINT GLASS | LOW-MELTING-POINT GLASS | LOW-MELTING-POINT GLASS | LOW-MELTING-POINT GLASS |
| SINTERING TEMPERATURE (°C) OF AERATION MEMBER | 750 | 750 | 730 | 730 | 710 | --- | --- |
| DIAMETER (mm) OF AERATION MEMBER | 20 | 20 | 10 | 10 | 10 | 1 | 2 |
| LENGTH (mm) OF AERATION MEMBER | 1 | 5 | 10 | 5 | 10 | 10 | 10 |
| AERATION RATE (cc/min) | 0.5 | 0.1 | 0.05 | 0.1 | 0.1 | 0.05 | 0.2 |
| AMOUNT (cc) OF INITIAL ADSORPTION | 7.5 | 7.5 | 7.5 | 7.5 | 7.5 | 7.5 | 7.5 |
| AMOUNT (cc) OF ADSORPTION AFTER 10 MINUTES | 2.5 | 6.5 | 7 | 6.5 | 6.5 | 7 | 5.5 |

FIG. 13

|  |  | EXAMPLE 10 | EXAMPLE 11 | EXAMPLE 12 | EXAMPLE 13 | EXAMPLE 14 | EXAMPLE 15 |
|---|---|---|---|---|---|---|---|
| APPLICATION OF JOINING LAYER | | APPLIED | ← | ← | ← | ← | ← |
| SLOPE ANGLE (°) | | 30 | ← | ← | ← | 45 | 30 |
| MATERIAL OF AERATION MEMBER | | GLASS POWDER | GLASS POWDER | GLASS POWDER | GLASS POWDER | GLASS POWDER | CERAMIC POWDER |
| PERIOD OF REMAINING TIME (min) IN AIR | | 0 | 10 | 20 | 30 | 0 | ← |
| EVALUATION RESULT | AERATION RATE (cc/min) OF AERATION MEMBER | 0.1 | 0.1 | 0.1 | 0.1 | 0.1 | 0.1 |
| | AMOUNT (cc) OF ADSORPTION | 3.5 | 2.5 | 1.5 | 0.5 | 3.5 | 3.5 |
| | THERMAL CONDUCTIVITY (INITIAL) | 0.0020 | 0.0020 | 0.0020 | 0.0020 | 0.0020 | 0.0020 |
| | THERMAL CONDUCTIVITY (AFTER 200 DAYS) | 0.0020 | 0.0020 | 0.0025 | 0.0040 | 0.0020 | 0.0020 |

|  |  | COMPARATIVE EXAMPLE 1 | COMPARATIVE EXAMPLE 2 | COMPARATIVE EXAMPLE 3 |
|---|---|---|---|---|
| APPLICATION OF JOINING LAYER | | NOT APPLIED | ← | ← |
| PERIOD OF REMAINING TIME (min) IN AIR | | 10 | 0 | 10 |
| EVALUATION RESULT | AERATION RATE (cc/min) OF AERATION MEMBER | --- | 0.1 | ← |
| | AMOUNT (cc) OF ADSORPTION | 0.1 | 0.05 | 0 |
| | THERMAL CONDUCTIVITY (INITIAL) | 0.0022 | 0.0025 | 0.0030 |
| | THERMAL CONDUCTIVITY (AFTER 200 DAYS) | 0.0050 | 0.0052 | 0.0056 |

GAS-ADSORBING DEVICE AND EVACUATED INSULATING MATERIAL USING SAME

TECHNICAL FIELD

The present invention relates to a gas-adsorbing device and an evacuated insulating material using the gas-adsorbing device.

BACKGROUND ART

There have been proposed various gas-adsorbing devices in order to be used in an evacuated insulating body that is manufactured by covering a core with a jacket having gas barrier properties and reducing pressure inside the jacket. The gas-adsorbing devices contain a gas adsorptive substance capable of adsorbing an air component, particularly, nitrogen as an adsorption-resistive gas.

Such gas-adsorbing devices adsorb a gas, which is not completely removed by an industrial evacuation process, but remains inside the jacket of an insulating body, and remove the gas from the inside of the jacket such that a heat insulation capacity is improved. However, when the gas-adsorbing device is brought into contact with air before being applied to the insulating body, the gas adsorptive substance of the gas-adsorbing device adsorbs an air component or the like and a part of the substance is likely to be consumed.

For example, there has been proposed a device in order to maintain a vacuum in an insulated jacket. In the device, an open-top container formed of a gas-impermeable material is filled with a Ba—Li alloy having reactivity to a gas such as nitrogen even at room temperature. Powder of a dry material is disposed in the top portion of the container so as to cover the Ba—Li alloy (for example, see PTL 1).

In the device, the powder of the dry material is disposed, thereby making it possible to reduce moisture adsorption by the Ba—Li alloy and thus, making it possible to reduce consumption of the Ba—Li alloy due to the moisture adsorption.

In addition, there has been proposed a container that contains a gas adsorbent in order to be used in an evacuated insulating material. The container includes an outer shell that covers the gas adsorbent, and a communicating portion through which the inside and the outside of the outer shell communicate with each other when a predetermined external force is applied, but the inside and the outside of the outer shell do not communicate with each other when no external force is applied (for example, see PTL 2).

In the container in which the gas adsorbent is contained, the outer shell prevents the gas adsorbent from being exposed to air or the like, and, when the gas adsorbent is used, an external force applied to the communicating portion causes the inside and the outside of the outer shell to communicate with each other such that gas adsorption is started. Hence, according to the container, it is possible to reduce consumption of the gas adsorbent and thus, it is possible to maintain a high adsorption performance in any environment.

In addition, there has been also proposed a gas-adsorbing device using a gas-permeability resistive container having one end opened and the other end sealed. The gas-permeability resistive container is formed of a hollow cylindrical metal member having a body portion of which a length from one end to the other end is equal to or longer than the maximum width of an end portion. When the gas-adsorbing device is manufactured, the gas-permeability resistive container is filled with the gas adsorbent from an opening, and then, a sealing member is disposed in the vicinity of the opening inside the opening. Then, the sealing member is heated and melted, and then, the sealing member inside the opening is cooled and is solidified, thereby sealing the opening (for example, see PTL 3).

Use of the device makes it possible to reduce degradation of the gas adsorbent during the process of disposing the gas-adsorbing device in a space having air as an adsorption target. Further, in the gas-adsorbing device, at least one of the sealing member, an interface between the sealing member and the gas-permeability resistive container, or the gas-permeability resistive container, is broken such that the inside and the outside of the gas-permeability resistive container communicate with each other. Thus, the gas-adsorbing device can adsorb a gas as the adsorption target.

Here, the gas adsorbent containing copper ion-exchanged ZSM-5-type zeolite is characterized by a higher gas adsorption capacity and a higher adsorption rate than a gas adsorbent in the related art. On the other hand, similar to the gas adsorbent in the related art, when the gas adsorbent is brought into contact with air before being applied to a space having a gas as the adsorption target, such as the insulating body, the gas adsorbent adsorbs nitrogen, oxygen, moisture, and the like and is consumed. Then, this results in reduction of the capacity of adsorbing air which is not completely removed by the industrial evacuation process, but remains in the inside of the jacket of the evacuated insulating body.

In the device disclosed in PTL 1, the Ba—Li alloy has a relatively low capacity of nitrogen adsorption and a slow adsorption rate. In addition, Ba is a substance designated by the Pollutant Release and Transfer Register (PRTR) at least in Japan. Therefore, it is desirable that, when a material containing Ba is industrially used, the material is safe for the environment and humans. In addition, the covering with the powder of the dry material can reduce an amount of moisture reaching the Ba—Li alloy; however, it is not possible to prevent the air from reaching the alloy. Therefore, the Ba—Li alloy is likely to adsorb the air and a part thereof is likely to be consumed.

In addition, in technology disclosed in PTL 2, control of non-communication or communication between the inside and the outside of the container containing the gas adsorbent is performed by the external force. Thus, it is possible to prevent consumption of the gas adsorbent by the communication between the inside and the outside of the container in the inside of the insulator at a required timing. On the other hand, the external force is required for the control and thus, there are costs required for applying a mechanism to the container. Further, in the case where moisture is contained in the gas, which is not completely removed by the industrial evacuation process, but remains inside the jacket, it is not possible to reduce consumption of the gas adsorbent due to the moisture adsorption.

In addition, in the device disclosed in PTL 3, when the gas as the adsorption target is adsorbed, the device is disposed in a space having the gas and then, there is a need to apply a force from the outside of the space so as to break the sealing member.

CITATION LIST

Patent Literature

PTL 1: Japanese Patent Unexamined Publication (Translation of PCT Application) No. 9-512088

PTL 2: Japanese Patent Unexamined Publication No. 2008-56317

PTL 3: Japanese Patent Unexamined Publication No. 2011-183367

SUMMARY OF THE INVENTION

The present invention is made in consideration of the problems described above, and an object thereof is to provide a gas-adsorbing device and an evacuated insulating material using the gas-adsorbing device in which it is possible to reduce consumption of a gas adsorbent due to contact with air even when the gas adsorbent is handled in air, and the inside and the outside of a container do not need to communicate with each other after the gas-adsorbing device is applied to a space having a gas as an adsorption target.

A gas-adsorbing device of the present invention includes: a container; a gas adsorbent configured to be disposed inside the container so as to adsorb a gas; and an aeration member having a predetermined aeration rate. The gas adsorbent is disposed in a space formed by the container and the aeration member.

In this configuration, it is possible to attain a gas-adsorbing device in which it is possible to reduce consumption of the gas adsorbent due to contact with air, even when the gas-adsorbing device is handled in air, and, as a result, it is possible to adsorb a large amount of a gas as an adsorption target.

In addition, after the gas-adsorbing device of the present invention is applied to a space having the gas as the adsorption target, the inside and the outside of the container may not be caused to communicate with each other. Hence, it is possible to reduce the man-hours when the device is applied to the space having the gas as the adsorption target.

BRIEF DESCRIPTION OF DRAWINGS

FIG. 6 is a table showing conditions and measurement results of Examples 1 to 7, related to an example in which a period of air-contact time is 10 minutes, in the gas-adsorbing devices described from the first to third exemplary embodiments of the present invention.

FIG. 13 is a table showing conditions and evaluation results of Examples 10 to 15 of the gas-adsorbing device according to the sixth exemplary embodiment of the present invention.

DESCRIPTION OF EMBODIMENTS

Hereinafter, exemplary embodiments of the present invention will be described with reference to the drawings.

(First Exemplary Embodiment)

Figure 1:
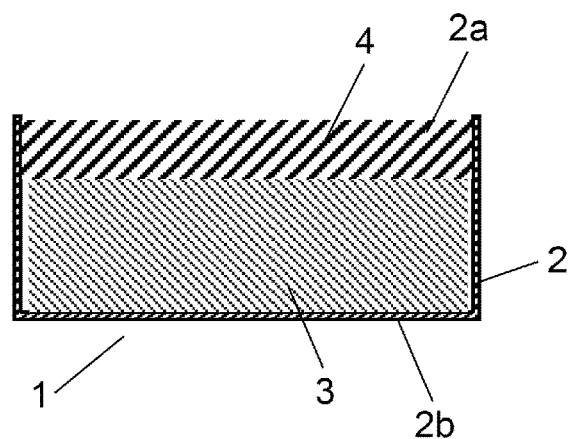
FIG. 1 is a sectional view of a gas-adsorbing device according to a first exemplary embodiment of the present invention.

FIG. 1 is a sectional view of gas-adsorbing device 1 according to the first exemplary embodiment of the present invention.

In FIG. 1, gas-adsorbing device 1 includes container 2, gas adsorbent 3, and aeration member 4 formed of a sintered body. Container 2 has a cylindrical shape with opening 2a and bottom portion 2b. Gas adsorbent 3 is configured to be disposed in container 2 and to adsorb a gas. Aeration member 4 has a predetermined aeration rate. Gas adsorbent 3 is disposed in a space formed by container 2 and aeration member 4.

Gas adsorbent 3 is disposed in or fills container 2, then aeration member 4 is mechanically joined to opening 2a of container 2, and thereby gas-adsorbing device 1 is manufactured. In gas-adsorbing device 1, a gas, which needs to be adsorbed, reaches gas adsorbent 3 through aeration member 4. At least one of a diameter or a length of a path, through which the gas passes, is appropriately adjusted, thereby making it possible to control the aeration rate of aeration member 4. Thus, aeration member 4 is adjusted to have the predetermined aeration rate and to have appropriate aeration properties. Accordingly, although gas-adsorbing device 1 is handled in air, it is possible to reduce consumption of gas adsorbent 3 due to contact with air. Hence, it is possible to adsorb a large amount of gas adsorbent 3 which needs to be adsorbed.

Here, an example of a manufacturing method of gas-adsorbing device 1 of the first exemplary embodiment is described.

First, there is prepared a vacuum-heat-treated container, which can be sealed, of which pressure is reduced, and in which an aeration rate is controlled with a cock. After gas adsorbent 3 is disposed in the vacuum-heat-treated container, the vacuum-heat-treated container is connected to a vacuum system, with the cock of the vacuum-heat-treated container opened, and pressure in the vacuum-heat-treated container is reduced.

After the pressure is reduced, the inside of the vacuum-heat-treated container is heated. Thus, gas adsorbent 3 is activated and adsorption properties are imparted to the gas adsorbent. After the heat treatment is finished, cock of the vacuum-heat-treated container is closed with the cock so as to be sealed, then the vacuum-heat-treated container is separated from the vacuum system, and the vacuum-heat-treated container is disposed in a glove box having an argon atmosphere. Then, gas adsorbent 3 is brought out from the vacuum-heat-treated container in the glove box. Container 2 disposed in the glove box in advance is filled with gas adsorbent 3. Next, aeration member 4 is connected to opening 2a of container 2 by a mechanical operation and then, gas-adsorbing device 1 is manufactured.

Note that, since gas adsorbent 3 does not adsorb argon, gas adsorbent 3 is not degraded during the manufacture of gas-adsorbing device 1.

Container 2 of the exemplary embodiment has a volume that can be filled with a predetermined amount of gas adsorbent 3, and has gas barrier properties such that little air permeates the container even when the container is stored in the atmosphere. As container 2, for example, it is possible to use metal or an inorganic material selected from glass and ceramics.

As gas adsorbent 3, it is possible to use a material having gas adsorption properties such as various adsorbents obtained by chemical adsorption or physical adsorption, for example, various metal getters or zeolite. Further, it is desirable to use an adsorbent that can obtain adsorption properties by being subjected to heat treatment during the pressure reduction.

In addition, as aeration member 4, it is desirable to use a material that is adjusted to have appropriate aeration properties by sintering powder of ceramics or glass, or the like. For example, in order to reduce degradation of gas adsorbent 3 in the atmosphere, it is desirable that aeration member 4 has the aeration rate of 10 cc/min or lower. Further, in order to adsorb the gas as an adsorption target in a short time, it is desirable that aeration member 4 has the aeration rate of 0.01 cc/min or higher.

In other words, aeration member 4 has the aeration rate of 0.01 cc/min to 10 cc/min under a pressure difference of 1 atm, thereby making it possible to reduce an adsorption capacity by adsorbing air at atmospheric pressure. In addition, with such conditions, gas-adsorbing device 1 can obtain an appropriate adsorption rate when being disposed in a space having the gas as the adsorption target. In other words, the adsorption rate of gas-adsorbing device 1 is proportional to a product of the pressure difference between the inside and the outside of the space formed by container 2 and aeration member 4, and the aeration rate of aeration member 4. Hence, when the gas-adsorbing device is handled at the atmospheric pressure, it is desirable that aeration member 4 has a low aeration rate, and thus it is desirable that the aeration rate 10 cc/min or lower under the pressure difference of 1 atm.

Conversely, when gas-adsorbing device 1 is disposed in a space having the gas as the adsorption target, it is desirable that aeration member 4 has a high aeration rate, and it is desirable that the aeration rate is 0.01 cc/min or higher under the pressure difference of 1 atm. Hence, in order to satisfy both of the conditions, the aeration rate is 0.01 cc/min to 10 cc/min the pressure difference of 1 atm.

In the exemplary embodiment, the space formed of container 2 and aeration member 4 is completely enclosed by container 2 and aeration member 4. In addition, the space has a volume in which a required amount of gas adsorbent 3 can be accommodated.

Next, the sintered body in the exemplary embodiment will be described. An aggregate of powder of metal or an inorganic material is heated at a temperature lower than a melting point or about at a softening temperature, thereby deforming and joining so as to have a small surface area. In this manner, a void between grains of the powder is reduced in size such that the powder forms a solid and a sintered body is formed. Hence, the powder is sintered at an appropriate sintering temperature, thereby, making it possible to easily obtain the sintered body as aeration member 4 having appropriate aeration properties.

As described above, it is possible to obtain gas-adsorbing device 1 in which consumption of gas adsorbent 3 by being brought into contact with air is reduced even when the gas-adsorbing device is handled in the air. As a result, gas-adsorbing device 1 can adsorb a large amount of the gas as the adsorption target.

Further, in a case where a gas as an adsorption target in an evacuated insulating material contains moisture, a moisture adsorbent and gas-adsorbing device 1 may be disposed in a space having the gas as the adsorption target. Thus, since the moisture adsorbent mainly adsorbs the moisture, a probability that the gas adsorbent adsorbs the moisture is reduced.

In this manner, it is possible to use gas-adsorbing device 1 in order to improve insulation capacity of the evacuated insulating material, and remaining air, which is not completely removed by a mechanical pump in a manufacturing process of the evacuated insulating material, reaches and is adsorbed on gas adsorbent 3 through aeration member 4 of gas-adsorbing device 1. Thus, since a pressure in the evacuated insulating material is reduced, it is possible to improve the insulation capacity of the evacuated insulating material.

Further, when gas-adsorbing device 1 is in a state in which it is possible to adsorb the gas through aeration member 4, when being applied to the evacuated insulating material. Therefore, an opening process of the gas-adsorbing device is not required after the evacuated insulating material is manufactured, and thus it is possible to obtain an evacuated insulating material which is manufactured in a low cost.

In addition, in the configuration described above, even in a case where gas adsorbent 3 is copper ion-exchanged ZSM-5-type zeolite having a high gas adsorption capacity and a high adsorption rate of a gas, it is possible to adsorb a large amount of a gas which needs to be adsorbed.

The exemplary embodiment employs a configuration in which the gas which needs to be adsorbed reaches gas adsorbent 3 through aeration member 4. Further, as aeration member 4, a material, of which at least one of a diameter or a length of a path, through which the gas passes, is appropriately adjusted so as to have aeration properties, is used. Thus, it is possible to control the aeration rate of gas-adsorbing device 1.

Even when gas-adsorbing device 1 of the exemplary embodiment is handled in the air, the consumption of gas adsorbent 3 due to the contact with air is reduced such that it is possible to adsorb a large amount of the gas which needs to be adsorbed.

(Second Exemplary Embodiment)

Next, the second exemplary embodiment of the present invention will be described.

Figure 2:
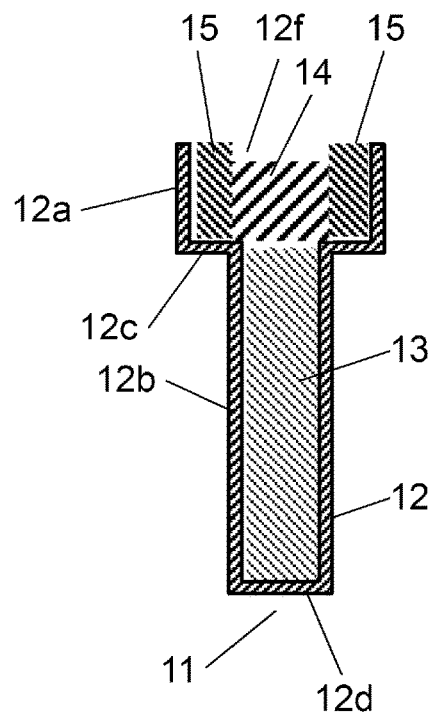
FIG. 2 is a sectional view showing a configuration of a gas-adsorbing device, before a heat treatment, according to a second exemplary embodiment of the present invention.

FIG. 2 is a sectional view showing a configuration of gas-adsorbing device 11, before a heat treatment, according to the second exemplary embodiment of the present invention.

In FIG. 2, gas-adsorbing device 11 includes container 12, gas adsorbent 13, aeration member 14 formed of a sintered body, and joining material 15. Container 12 is configured of metal having a cylindrical shape that is sealed on one side and has bottom portion 12d. In container 12, a diameter of first portion 12a on opening 12f side is larger than a diameter of second portion 12b on bottom portion 12d side, and first portion 12a and second portion 12b are connected via step portion 12c.

Note that container 12 may be formed of metal having a circular cylindrical shape or a cylindrical shape except for the circular cylindrical shape.

Here, gas adsorbent 13 is subjected to a heat treatment at 600° C. under reduced pressure so as to adsorb a gas.

Aeration member 14 is obtained by sintering, at 700° C., a compact of glass powder having the softening temperature of 700° C. Thus, the aeration rate of aeration member 14 is adjusted to be 0.1 cc/min under the pressure difference of 1 atm.

Joining material 15 is formed of low-melting-point glass that has the softening temperature of 500° C., and has sufficient flowability at 620° C.

Figure 3:
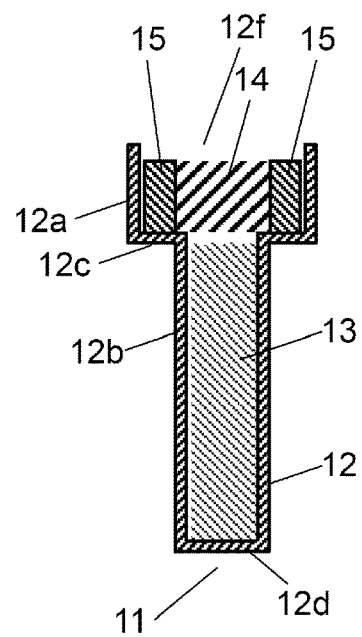
FIG. 3 is a sectional view showing a configuration of the gas-adsorbing device, after the heat treatment, according to the second exemplary embodiment of the present invention.

FIG. 3 is a sectional view showing a configuration of gas-adsorbing device 11, after the heat treatment, according to the second exemplary embodiment of the present invention.

Here, an example of a manufacturing method of gas-adsorbing device 11 of the second exemplary embodiment is described.

First, container 12 is disposed to have opening 12f on the upper side, and container 12 is filled with gas adsorbent 13. After aeration member 14 is disposed on gas adsorbent 13, joining material 15 is disposed in a gap between container 2 and aeration member 14. Since joining material 15 has a powdery shape, the joining material is easily disposed in the gap between container 12 and aeration member 14.

Next, a member set as described above is disposed in a pressure reduction-type heating furnace. In the pressure reduction-type heating furnace, the pressure therein is reduced, and then heating is performed to the activation temperature of 600° C. of the gas adsorbent 13 such that adsorption properties is imparted to gas adsorbent 13.

Then, the gas adsorbent is subjected to heating to a temperature of 620° C., at which joining material 15 sufficiently flows, in the pressure reduction-type heating furnace. Thus, sufficient flowability is imparted to joining material 15, and joining material 15 flows due to the gravity and is stored in the gap between container 12 and aeration member 14. Then, joining material 15 is solidified by cooling while the reduced pressure is maintained, in the pressure reduction-type heating furnace. Thus, container 12 and aeration member 14 are joined to each other with joining material 15, and gas-adsorbing device 11 enters a state obtained after the heat treatment shown in FIG. 3.

In this state, it is possible for gas-adsorbing device 11 to adsorb the gas. Hence, in general, until gas-adsorbing device 11 is disposed in a space having the gas as the adsorption target, the gas-adsorbing device needs not to be brought into contact with the atmosphere.

However, in gas-adsorbing device 11 of the exemplary embodiment, the gas, which needs to be adsorbed, reaches gas adsorbent 13 through aeration member 14. Thus, at least one of a diameter or a length of a path of aeration member 14, through which the gas passes, is appropriately adjusted, thereby making it possible to control the aeration rate. Therefore, aeration member 14 has the predetermined aeration rate and has the appropriate adsorption properties. Specifically, the aeration rate of aeration member 14 can be controlled to be 0.1 cc/min. Accordingly, although gas-adsorbing device 11 is handled in the air, it is possible to reduce consumption of gas adsorbent 13 due to contact with the air. Hence, it is possible for gas-adsorbing device 11 to adsorb a large amount of the gas which needs to be adsorbed.

Gas adsorbent 13 is subjected to the heat treatment under the reduced pressure, thereby obtaining adsorption properties. In the exemplary embodiment, at least one of a melting point or a softening temperature of container 12 and aeration member 14 is higher than a temperature of the heat treatment of gas adsorbent 13. Therefore, even when the space formed by container 12 and aeration member 14 is filled with gas adsorbent 13 and then, the heat treatment is performed, container 12 and aeration member 14 are not deformed or melted. At this time, the aeration rate of aeration member 14 is not influenced by the heat treatment such that it is possible to obtain gas-adsorbing device 11 without changing the appropriately adjusted aeration rate.

Further, aeration member 14 is formed of a sintered body, thereby making it possible to adjust the aeration rate to an appropriate value. In other words, as described in the first exemplary embodiment, the powder is sintered at an appropriate sintering temperature, thereby, making it possible to obtain a sintered body as aeration member 14 having the appropriate aeration properties. As a result, it is possible to obtain gas-adsorbing device 11 in which consumption of gas adsorbent 13 due to contact the air is reduced even when the gas-adsorbing device is handled in the air. Thus, gas-adsorbing device 11 can adsorb a large amount of the gas which needs to be adsorbed.

Further, use of thermoplastic joining material 15 enables gas adsorbent 13 to be sealed in container 12 under the reduced pressure with joining material 15. Since thermoplastic joining material 15 can obtain flowability by applying heat, the joining material flows to a lower side due to the gravity in a case of being disposed on a slope surface. In the case of the disposition of container 12 and aeration member 14 in the second exemplary embodiment, joining material 15 flows in the gap between container 12 and aeration member 14 such that container 12 and aeration member 14 are joined to each other. In other words, since thermoplastic joining material 15 automatically flows into a joining position due to heating without an external treatment, it is possible to join and seal the joining positions by cooling.

In this manner, in the exemplary embodiment, after the heat treatment under the reduced pressure, gas adsorbent 13 is not handled in the atmosphere. In addition, it is possible to prevent an increase in the man-hours due to the difficulty in handling of gas adsorbent 13 under reduced pressure or in an inert gas. Further, it is possible to prevent degradation of gas-adsorbing device due to adsorption of impurity gas contained in an environment under the reduced pressure or in the inert gas, during the handling of gas adsorbent 13. Hence, it is possible to reduce the man-hours and thus, it is possible to obtain gas-adsorbing device 11 with a low cost.

Further, since at least one of that the melting point of joining material 15 is lower than the melting point of aeration member 14 or that the softening temperature of joining material 15 is lower than the softening temperature of aeration member 14 is satisfied, it is possible to impart the flowability to joining material 15 with no influence on the aeration rate of aeration member 14. In the case of the disposition of container 12 and aeration member 14 in the second exemplary embodiment, joining material 15 flows in the gap between container 12 and aeration member 14 such that container 12 and aeration member 14 are joined to each other. In other words, thermoplastic joining material 15 automatically flows into the joining position due to heating without an external treatment. Then, it is possible to join and seal the joining positions by cooling. As a result, it is possible to obtain gas-adsorbing device 11 with the appropriately adjusted aeration rate of aeration member 14 not changed.

Container 12 of the exemplary embodiment has a volume that can be filled with a predetermined amount of gas adsorbent 13, can withstand a temperature of a melting-point heat treatment of joining material 15, and has gas barrier properties such that little air permeates in the container even when the container is stored in the atmosphere. Since an upper temperature limit of container 2 is required to be higher than the temperature of the heat treatment of gas adsorbent 13, as container 12, for example, it is possible to use a material selected from metal, an inorganic material selected from glass or ceramics, and the like.

It is desirable that aeration member 14 of the exemplary embodiment is made of a material of which the aeration rate very little changes in a case of being heated to the temperature at which joining material 15 starts to flow. For example, as the aeration member, it is desirable to use a material that is adjusted to have appropriate aeration properties by sintering powder of ceramics or glass. For example, as aeration member 14, it is desirable to use glass having the softening temperature higher than the softening temperature of joining material 15 by 100° C. or higher, and preferably by 150° C. or higher. In order to reduce degradation of gas adsorbent 13 in the atmosphere through aeration member 14, it is desirable that aeration member 14 has the aeration rate of 10 cc/min or lower. Further, in order to adsorb the gas as the adsorption target in a shorter time through aeration member 14, it is desirable that aeration member 14 has the aeration rate of 0.01 cc/min or higher.

In the exemplary embodiment, it is desirable that joining material 15 is, for example, glass. It is desirable to use a material that has thermoplasticity and can provide joining at a target position by flowing due to the gravity about at the temperature of the heat treatment of gas adsorbent 13. Further, it is desirable to use a material having joining properties with a member of container 12, such as iron. Further, it is desirable to use a material having a low amount of gas release in the space having the gas as the adsorption target, such as the evacuated insulating material.

(Third Exemplary Embodiment)

Next, the third exemplary embodiment of the present invention will be described.

Figure 4:
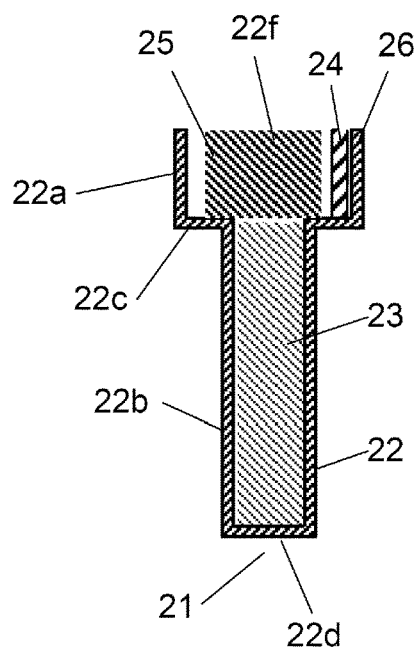
FIG. 4 is a sectional view showing a configuration of a gas-adsorbing device, before a heat treatment, according to a third exemplary embodiment of the present invention.

FIG. 4 is a sectional view showing a configuration of gas-adsorbing device 21, before a heat treatment, according to the third exemplary embodiment of the present invention.

In FIG. 4, gas-adsorbing device 21 includes container 22, gas adsorbent 23, aeration member 24 with which cylindrical metal pipe 26 is filled, and joining material 25. Container 22 is formed of metal having a cylindrical shape that is sealed on one side and has bottom portion 22d. In container 22, a diameter of first portion 22a on opening 22f side is larger than a diameter of second portion 22b on bottom portion 22d side, and first portion 22a and second portion 22b are connected via step portion 22c.

Here, aeration member 24 and gas adsorbent 23 communicate with each other through a gas moving passage such as a communication hole, a gap, or the like, provided in the step portion 22c.

Note that container 22 may be formed of metal having a circular cylindrical shape or a cylindrical shape except for the circular cylindrical shape.

Gas adsorbent 23 is made of copper ion-exchanged ZSM-5-type zeolite, is subjected to a heat treatment at 600° C. under reduced pressure, and thereby can adsorb a gas.

Aeration member 24 is obtained by filling metal pipe 26 with glass power having the softening temperature of 700° C., and the aeration rate is adjusted to be 0.1 cc/min under the pressure difference of 1 atm. In the exemplary embodiment, aeration member 24 has a circular cylindrical shape, with a diameter thereof thinner than the diameter of opening 22f of container 22, and a length of the cylinder is the same as the length from the opening 22f to the vicinity of a position of step portion 22c of container 22.

Joining material 25 is formed of low-melting-point glass that has the softening temperature of 500° C., and has sufficient flowability at 620° C.

Figure 5:
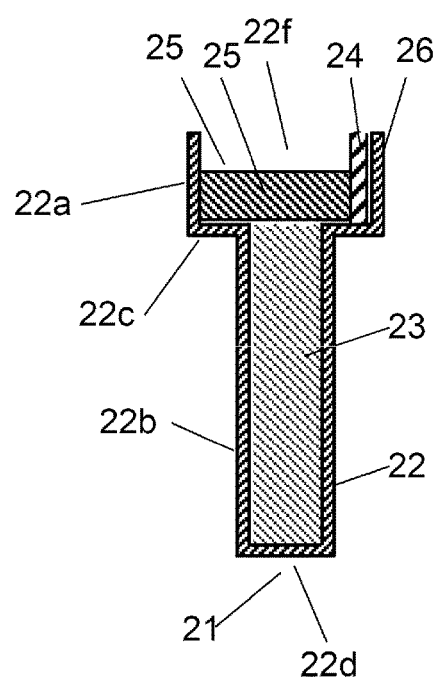
FIG. 5 is a sectional view showing a configuration of the gas-adsorbing device, after the heat treatment, according to the third exemplary embodiment of the present invention.

FIG. 5 is a sectional view showing a configuration of gas-adsorbing device 21, after the heat treatment, according to the third exemplary embodiment of the present invention.

Here, an example of a manufacturing method of gas-adsorbing device 21 the exemplary embodiment is described.

First, container 22 is disposed to have an opening thereof on the upper side, and container 22 is filled with gas adsorbent 23. After aeration member 24 is disposed, joining material 25 is disposed.

Next, a member set as described above is disposed in the pressure reduction-type heating furnace. In the pressure reduction-type heating furnace, the pressure therein is reduced, and then heating is performed to the activation temperature of 600° C. of the gas adsorbent 23 such that adsorption properties is imparted to the gas adsorbent.

Then, the gas adsorbent is subjected to heating to a temperature of 620° C., at which joining material 25 sufficiently flows, in the pressure reduction-type heating furnace. Thus, sufficient flowability is imparted to joining material 25, and joining material 25 flows due to the gravity and is stored in the gap between container 22 and aeration member 24. Then, joining material 25 is solidified by cooling while the reduced pressure is maintained, in the pressure reduction-type heating furnace. Thus, container 22 and aeration member 24 are joined to each other. Then, gas-adsorbing device 21 enters a state obtained after the heat treatment shown in FIG. 5.

In this state, it is possible for gas-adsorbing device 21 to adsorb the gas. Hence, in general, until gas-adsorbing device 21 is disposed in a space having the gas as the adsorption target, the gas-adsorbing device needs not to be brought into contact with the atmosphere. However, in gas-adsorbing device 21, the gas, which needs to be adsorbed, reaches gas adsorbent 23 through aeration member 24. Further, at least one of a diameter or a length of a path of aeration member 24, through which the gas passes, is appropriately adjusted, thereby making it possible to control the aeration rate. Thus, aeration member 24 has the predetermined aeration rate and has the appropriate aeration properties.

Thus, the aeration rate of aeration member 24 is controlled to be 0.1 cc/min. Therefore, although gas-adsorbing device 21 is handled in the air, it is possible to reduce consumption of gas adsorbent 23 due to contact with the air. Hence, it is possible for gas-adsorbing device 21 to adsorb a large amount of the gas which needs to be adsorbed.

Hereinafter, as Examples 1 to 9, examples in which gas-adsorbing devices manufactured by changing conditions are applied to evacuated insulating materials after being brought into contact with air.

In consideration of mass production, it is desirable that a period of time after the gas-adsorbing device is applied to the evacuated insulating material until the adsorption of the air inside the evacuated insulating material is completed is short. Hence, the period of time taken until the adsorption of the air inside the evacuated insulating material is completed is also evaluated.

In Examples, 1.5 g of copper ion-exchanged ZSM-5-type zeolite is used as gas adsorbents 3, 13, and 23 for each device. An amount of nitrogen adsorption by gas adsorbents 3, 13, and 23 is 5 cc per 1 g at an adsorption equilibrium pressure of 10 Pa.

The measurement of the aeration rate is performed by using a flow meter manufactured by Horiba Stec, and the measurement of the amount of nitrogen adsorption is performed by using Autosorb manufactured by Quantachrome Instruments.

FIG. 6 is a table showing conditions and measurement results of Examples 1 to 7, related to an example in which a period of air-contact time is 10 minutes, in gas-adsorbing devices 1, 11, and 21 described from the first exemplary embodiment to the third exemplary embodiment of the present invention.

(Example 1)

In Example 1, gas-adsorbing device 1 shown in FIG. 1 is used. Gas-adsorbing device 1 includes container 2, gas adsorbent 3, and aeration member 4 formed of a sintered body. In gas-adsorbing device 1, container 2 made of stainless steel having a thickness of 0.3 mm, a diameter of 20 mm, and a depth of 10 mm, is filled with gas adsorbent 3, and then, aeration member 4 is joined thereto by a mechanical operation. Glass powder is pressed and then sintered at 750° C. such that aeration member 4 is manufactured to have a diameter of 20 mm and a thickness of 1 mm. The aeration rate of aeration member 4 is 0.5 cc/min.

A result of the amount of nitrogen adsorption measured immediately after gas-adsorbing device 1 is manufactured is 7.5 cc at an adsorption equilibrium pressure of 10 Pa. Further, a result of the amount of nitrogen adsorption measured after the gas-adsorbing device is in contact with the atmosphere for ten minutes is 2.5 cc. It is considered that this is because the air adsorbing device is in contact with the atmosphere for ten minutes, thus 5 cc of air permeates in container 2 through aeration member 4 having the aeration rate of 0.5 cc/min, and the amount of adsorption of gas adsorbent 3 is consumed by 5 cc.

It is possible to confirm improvement of insulation capacity as a result of applying gas-adsorbing device 1 of Example 1 to the evacuated insulating material after the gas-adsorbing device is in contact with the atmosphere for ten minutes. A reason of the improvement of the insulation capacity is considered as follows. The air which needs to be adsorbed reaches gas adsorbent 3 through aeration member 4 of which the aeration rate is controlled, thereby making it possible to reduce consumption of gas adsorbent 3 due to the contact with the air even when the gas-adsorbing device is handled in the air. As a result, it is possible to adsorb the gas which needs to be adsorbed. Hence, gas-adsorbing device 1 adsorbs and removes the gas remaining inside a jacket of the evacuated insulating material, and thereby improvement of the insulation capacity is achieved.

The gas remaining inside the jacket of the evacuated insulating material is a gas that is not completely removed by an industrial evacuation process. Note that the adsorption of the gas in the evacuated insulating material is completed in six hours' time and thus, it is determined that the adsorption can be performed in a short time.

(Example 2)

In Example 2, similar to Example 1, gas-adsorbing device 1 shown in FIG. 1 is used. Conditions of Example 2 differ from those in Example 1 in that aeration member 4 is manufactured to have a diameter of 20 mm and a thickness of 5 mm, and the aeration rate of aeration member 4 is 0.1 cc/min. The other conditions are the same as those in Example 1.

A result of the amount of nitrogen adsorption measured immediately after gas-adsorbing device 1 is manufactured is 7.5 cc at an adsorption equilibrium pressure of 10 Pa. Further, a result of the amount of nitrogen adsorption measured after the gas-adsorbing device is in contact with the atmosphere for ten minutes is 6.5 cc.

It is considered that this is because the air adsorbing device is in contact with the atmosphere for ten minutes, thus 1 cc of air permeates in the container through aeration member 4 having the aeration rate of 0.1 cc/min, and thus the amount of adsorption of gas adsorbent 3 is consumed by 1 cc.

Here, the aeration rate of 0.1 cc of the aeration member is one fifth of the aeration rate of the aeration member of Example 1. It is determined that the thickness of aeration member 4 is five times as thick as compared to Example 1 and thus, the aeration rate is inversely proportional to the thickness.

It is possible to confirm improvement of insulation capacity as a result of applying gas-adsorbing device 1 of Example 2 to the evacuated insulating material after the gas-adsorbing device is in contact with the atmosphere for ten minutes. A reason of the improvement of the insulation capacity is considered to be the same as the reason of the improvement of the insulation capacity in Example 1. Note that the adsorption of the gas in the evacuated insulating material is completed in one day' time and thus, it is determined that the adsorption can be performed in a short time.

(Example 3)

In Example 3, gas-adsorbing device 11 having the configuration shown in FIG. 3 is used. Gas-adsorbing device 11 has step portion 12c having a length of 90 mm, a diameter of first portion 12a on opening 12f side is larger than a diameter of second portion 12b, and a diameter of first portion 12a at a distance of 10 mm from opening 12f is 12 mm. In addition, a diameter of second portion 12b having a length of 80 mm from a portion at a distance of 10 mm from opening 12f to the bottom portion 12d is 9 mm. In gas-adsorbing device 11, gas adsorbent 13 is disposed in a space formed by container 12 made of aluminum having a thickness of 0.3 mm, and aeration member 14 manufactured to have a diameter of 10 mm and a length of 10 mm by pressing and sintering glass powder at 730° C.

Gas adsorbent 13 is completely enclosed by container 12 and aeration member 14. Further, joining material 15 is disposed in a gap between aeration member 14 and container 12. Gas-adsorbing device 11 is subjected to a heat treatment at 620° C. in the pressure-reduction-type heating furnace and then, is cooled.

The aeration rate of aeration member 14 of Example 3 is 0.05 cc/min.

A result of the amount of nitrogen adsorption measured immediately after gas-adsorbing device 11 is manufactured is 7.5 cc at an adsorption equilibrium pressure of 10 Pa. Further, a result of the amount of nitrogen adsorption measured after the gas-adsorbing device is in contact with the atmosphere for ten minutes is 7 cc.

It is considered that this is because the air adsorbing device is in contact with the atmosphere for ten minutes, thus 0.5 cc of air permeates in the container through the aeration member having the aeration rate of 0.05 cc/min, and thus the amount of adsorption of the gas adsorbent is consumed by 0.5 cc.

It is possible to confirm improvement of insulation capacity as a result of applying gas-adsorbing device 11 of Example 3 to the evacuated insulating material after the gas-adsorbing device is in contact with the atmosphere for ten minutes. A reason of the improvement of the insulation capacity is considered to be as follows. The air which needs to be adsorbed reaches gas adsorbent 13 through aeration member 14 of which the aeration rate is controlled, thereby consumption of gas adsorbent 13 due to the contact with the air is reduced even when the gas-adsorbing device is handled in the air. As a result, it is possible to adsorb the gas which needs to be adsorbed. Hence, gas-adsorbing device 11 adsorbs and removes the gas remaining inside the jacket of the evacuated insulating material, and thereby improvement of the insulation capacity is achieved.

The gas remaining inside the jacket of the evacuated insulating material is a gas that is completely not removed by the industrial evacuation process. Note that the adsorption of the gas in the evacuated insulating material is completed in two days' time and thus, it is determined that the adsorption can be performed in a short time.

(Example 4)

In Example 4, similar to Example 3, gas-adsorbing device 11 shown in FIG. 3 is used. Conditions of Example 4 differ from those in Example 3 in that aeration member 14 is manufactured to have a diameter of 10 mm and a length of 5 mm, and the aeration rate of aeration member 4 is 0.1 cc/min. The other conditions are the same as those in Example 3.

A result of the amount of nitrogen adsorption measured immediately after gas-adsorbing device 11 is manufactured is 7.5 cc at an adsorption equilibrium pressure of 10 Pa. Further, a result of the amount of nitrogen adsorption measured after the gas-adsorbing device is in contact with the atmosphere for ten minutes is 6.5 cc.

It is considered that this is because the air adsorbing device is in contact with the atmosphere for ten minutes, thus 1 cc of air permeates in the container through aeration member 14 having the aeration rate of 0.1 cc/min, and thus the amount of adsorption of gas adsorbent 13 is consumed by 1 cc.

Here, the aeration rate of 0.1 cc of the aeration member 14 is twice the aeration rate of aeration member 14 of Example 3. It is determined that the length of aeration member 14 is 0.5 times as long as compared to Example 3 and thus, the aeration rate is inversely proportional to the length.

It is possible to confirm improvement of insulation capacity as a result of applying gas-adsorbing device 11 of Example 4 to the evacuated insulating material after the gas-adsorbing device is in contact with the atmosphere for ten minutes. A reason of the improvement of the insulation capacity is considered to be as follows. The air which needs to be adsorbed reaches gas adsorbent 13 through aeration member 14 of which the aeration rate is controlled. As a result, consumption of gas adsorbent 13 due to the contact with the air is reduced even when the gas-adsorbing device 11 is handled in the air, and thus, it is possible to adsorb the gas which needs to be adsorbed. Hence, gas-adsorbing device 11 adsorbs and removes the gas remaining inside the jacket of the evacuated insulating material, and thereby improvement of the insulation capacity is achieved.

The gas remaining inside the jacket of the evacuated insulating material is a gas that is not completely removed by the industrial evacuation process. Note that the adsorption of the gas in the evacuated insulating material is completed in one day's time and thus, it is determined that the adsorption can be performed in a short time.

(Example 5)

In Example 5, similar to Example 3, gas-adsorbing device 11 shown in FIG. 3 is used. Conditions of Example 5 differ from those in Example 3 in that glass powder is pressed and then sintered at 710° C. such that aeration member 14 is manufactured to have a diameter of 10 mm and a length of 10 mm, and the aeration rate of aeration member 14 is 0.1 cc/min. The other conditions are the same as those in Example 3.

A result of the amount of nitrogen adsorption measured immediately after gas-adsorbing device 11 is manufactured is 7.5 cc at an adsorption equilibrium pressure of 10 Pa. Further, a result of the amount of nitrogen adsorption measured after the gas-adsorbing device is in contact with the atmosphere for ten minutes is 6.5 cc.

It is considered that this is because the air adsorbing device is in contact with the atmosphere for ten minutes, thus 1 cc of air permeates in the container through aeration member 14 having the aeration rate of 0.1 cc/min, and thus the amount of adsorption of gas adsorbent 13 is consumed by 1 cc.

Here, the aeration member 14 has the same shape as that in Example 3; however, the aeration rate of 0.1 cc/min of the aeration member 14 is twice the aeration rate of the aeration member of Example 3. It is considered that this is because the sintering temperature of aeration member 14 of Example 5 is 710° C. lower than 730° C. which is the sintering temperature of aeration member 14 of Example 3, thus, a degree of sintering is low, that is, many voids are formed, and the aeration rate is more increased when the aeration member has the same shape.

It is possible to confirm improvement of the insulation capacity as a result of applying gas-adsorbing device 11 of Example 5 to the evacuated insulating material after the gas-adsorbing device is in contact with the atmosphere for ten minutes. A reason of the improvement of the insulation capacity is considered to be the same as the reason of the improvement of the insulation capacity in Example 3. Note that the adsorption of the gas in the evacuated insulating material is completed in one day' time and thus, it is determined that the adsorption can be performed in a short time.

(Example 6)

In Example 6, gas-adsorbing device 21 shown in FIG. 5 is used. Gas-adsorbing device 21 has a stepped shape having a length of 90 mm, and a diameter on opening 22f side is larger than that of the other portion. A diameter of first portion 22a at a position at a distance of 10 mm from opening 22f is 12 mm, and a diameter of second portion 22b having a length of 80 mm from a portion at a distance of 10 mm from opening 22f to the bottom portion 22d is 9 mm.

In gas-adsorbing device 21, gas adsorbent 23 is disposed in a space formed by container 22 made of aluminum having a thickness of 0.3 mm, and aeration member 24 with metal pipe 26 having an outer diameter of 1.4 mm, an inner diameter of 1 mm, and a length of 10 mm, which is filled with glass powder. Thus, joining material 25 is disposed in a gap between aeration member 24 and container 22. Gas-adsorbing device 21 is subjected to a heat treatment at 620° C. in the pressure-reduction-type heating furnace and then, is cooled.

A result of the amount of nitrogen adsorption measured immediately after gas-adsorbing device 21 is manufactured is 7.5 cc at an adsorption equilibrium pressure of 10 Pa. Further, a result of the amount of nitrogen adsorption measured after the gas-adsorbing device is in contact with the atmosphere for ten minutes is 7 cc.

It is considered that this is because the air adsorbing device is in contact with the atmosphere for ten minutes, thus 0.5 cc of air permeates in the container through aeration member 24 having the aeration rate of 0.05 cc/min, and thus the amount of adsorption of the gas adsorbent is consumed by 0.5 cc.

Here, the shape of aeration member 24 makes it difficult to be disposed substantially parallel to a side surface of container 22 in the vicinity of opening 22f of container 22 when the manufacturing is performed. However, the length of a path through which the gas passes in aeration member 24 is the same, regardless of an angle between aeration member 24 and the side surface of container 22. Therefore, it is confirmed that the same aeration rate is achieved, regardless of an angle between aeration member 24 and the side surface of container 22.

It is possible to confirm improvement of the insulation capacity as a result of applying gas-adsorbing device 21 of Example 6 to the evacuated insulating material after the gas-adsorbing device is in contact with the atmosphere for ten minutes. A reason of the improvement of the insulation capacity is considered to be the same as the reason of the improvement of the insulation capacity in Examples described above. Note that the adsorption of the gas in the evacuated insulating material is completed in two days' time and thus, it is determined that the adsorption can be performed in a short time.

(Example 7)

In Example 7, gas-adsorbing device 21 shown in FIG. 5 is used. Conditions of Example 7 differ from those in Example 6 in that metal pipe 26 having an outer diameter of 2.4 mm, an inner diameter of 2 mm, and a length of 10 mm, is filled with glass powder such that aeration member 24 is manufactured, and the aeration rate of aeration member 24 is 0.2 cc/min.

A result of the amount of nitrogen adsorption measured immediately after gas-adsorbing device 21 is manufactured is 7.5 cc at an adsorption equilibrium pressure of 10 Pa. Further, a result of the amount of nitrogen adsorption measured after the gas-adsorbing device is in contact with the atmosphere for ten minutes is 5.5 cc.

It is considered that this is because the air adsorbing device is in contact with the atmosphere for ten minutes, thus 2 cc of air permeates in the container through aeration member 24 having the aeration rate of 0.2 cc/min, and thus the amount of adsorption of gas adsorbent 23 is consumed by 2 cc.

It is possible to confirm improvement of the insulation capacity as a result of applying gas-adsorbing device 21 of Example 7 to the evacuated insulating material after the gas-adsorbing device is in contact with the atmosphere for ten minutes. A reason of the improvement of the insulation capacity is considered to be the same as the reason of the improvement of the insulation capacity in Example 6. Note that the adsorption of the gas in the evacuated insulating material is completed in six hours' time and thus, it is determined that the adsorption can be performed in a short time.

(Example 8)

In Example 8, similar to Example 3, gas-adsorbing device 11 shown in FIG. 3 is used. Conditions of Example 8 differ from those in Example 3 in that glass powder is pressed and then sintered at 650° C. such that aeration member 14 is manufactured to have a diameter of 10 mm and a length of 10 mm, and the aeration rate of aeration member 14 is 20 cc/min.

In Example 8, the aeration rate of aeration member 14 is remarkably higher than the aeration rates of aeration members 4, 14, and 24 of Examples 1 to 7. Therefore, it is considered that a large amount of the gas is adsorbed in a period of short contact time with the atmosphere and an amount of adsorption of gas adsorbent 13 is consumed. Therefore, evaluation is performed for a period of contact time with the atmosphere of 15 seconds.

A result of the amount of nitrogen adsorption measured immediately after gas-adsorbing device 11 is manufactured is 7.5 cc at an adsorption equilibrium pressure of 10 Pa. Further, a result of the amount of nitrogen adsorption measured after the gas-adsorbing device is in contact with the atmosphere for 15 seconds is 2.5 cc.

It is considered that this is because the air adsorbing device is in contact with the atmosphere for 15 seconds, thus 5 cc of air permeates in container 12 through aeration member 14 having the aeration rate of 20 cc/min, and thus the amount of adsorption of gas adsorbent 13 is consumed by 5 cc.

As described above, in Example 8, since the aeration rate of aeration member 14 is remarkably higher than those in the other Examples, it is determined that consumption of gas adsorbent 13 is increased even though the period of contact time with the atmosphere is shortened to 15 seconds.

Here, the aeration rate of aeration member 14 is 20 cc/min that is higher than those in the other Examples; however, since the sintering temperature is 650° C. that is lower than those in the other Examples, many voids are formed.

It is possible to confirm improvement of the insulation capacity as a result of applying gas-adsorbing device 11 of Example 8 to the evacuated insulating material after the gas-adsorbing device is in contact with the atmosphere for 15 seconds. A reason of the improvement of the insulation capacity is considered to be the same as the reason of the improvement of the insulation capacity in Example 3. Note that the adsorption of the gas in the evacuated insulating material is completed in one hour' time and thus, it is determined that the adsorption can be performed in a short time.

(Example 9)

In Example 9, similar to Example 3, gas-adsorbing device 11 shown in FIG. 3 is used. Conditions of Example 9 differ from those in Example 3 in that gas-adsorbing device 11 has a stepped shape, and glass powder is pressed and then sintered at 780° C. such that aeration member 14 is manufactured to have a diameter of 10 mm and a length of 10 mm and, as a result, the aeration rate of aeration member 14 is 0.005 cc/min.

Here, the aeration rate of aeration member 14 is equal to or lower than a measurement limit of a flow meter. Hence, in order to measure the aeration rate, aeration member 14 has an area which is ten times the area thereof and the aeration rate is measured and is adjusted to be 0.05 cc/min.

A result of the amount of nitrogen adsorption measured immediately after gas-adsorbing device 11 is manufactured is 7.5 cc at an adsorption equilibrium pressure of 10 Pa. Further, a result of the amount of nitrogen adsorption measured after the gas-adsorbing device is in contact with the atmosphere for ten minutes is 7.45 cc.

It is considered that this is because the air adsorbing device is in contact with the atmosphere for ten minutes, thus 0.05 cc of air permeates in the container through aeration member 14 having the aeration rate of 0.005 cc/min, and thus the amount of adsorption of the gas adsorbent is consumed by 0.05 cc.

It is possible to confirm improvement of the insulation capacity as a result of applying gas-adsorbing device 11 of Example 9 to the evacuated insulating material after the gas-adsorbing device is in contact with the atmosphere for ten minutes. A reason of the improvement of the insulation capacity is considered to be the same as the reason of the improvement of the insulation capacity in Example 3. Note that the adsorption of the gas in the evacuated insulating material is completed in 15 days' time and thus, it is determined that it is difficult to perform the adsorption in a short time.

Here, a flow rate of a gas between different pressures is expressed by an increasing function of the pressure difference. Therefore, in a case where the aeration rate of aeration member 4 is low, it takes a period of time for gas-adsorbing device 11 to completely adsorb a gas, for example, in a space with a low pressure, for example, as the evacuated insulating material, by gas-adsorbing device 11. Hence, the aeration rate is adjusted to an appropriate value depending on an object, thereby making it possible to attain an appropriately specified gas-adsorbing device.

As described above, it is determined that the aeration rate of aeration member 14 formed of the sintered body depends on a shape and a void ratio based on a degree of sintering, is proportional to an area in which the gas passes, and is inversely proportional to a length through which the gas passes, when the shape is the same. Hence, it is possible to obtain a target aeration rate by appropriately adjusting at least one of the area or the length through which the gas passes even when aeration member 14 is formed of another material.

Hence, it is possible to attain a preferable gas-adsorbing device as follows. The gas-adsorbing device has a configuration in which the gas, which needs to be adsorbed, reaches the gas adsorbent through the aeration member. Further, the aeration member is formed of a material having aeration properties in which at least one of the diameter or the length of the path, through which the gas passes, is set to an appropriate value. Thus, it is possible to control the aeration rate. Thus, it is possible to attain a gas-adsorbing device in which it is possible to reduce consumption of the gas adsorbent due to contact with air, even when the gas-adsorbing device is handled in the air. As a result, it is possible to adsorb a large amount of the gas as an adsorption target.

Further, in the case where the gas as the adsorption target contains moisture, the moisture adsorbent and the gas-adsorbing device described in the exemplary embodiment may be disposed in a space having the gas as the adsorption target. In this case, since the moisture adsorbent mainly adsorbs the moisture, a probability that the gas adsorbent directly adsorbs the moisture is reduced. In other words, the moisture adsorbent adsorbs the moisture in the space containing the moisture; however, the gas adsorbent adsorbs the moisture through the aeration member. Therefore, the aeration rate of the aeration member is set to the appropriate value, a probability that the moisture is adsorbed on the moisture adsorbent is remarkably higher than a probability that the moisture is adsorbed on the gas adsorbent through the aeration member, and thus, it is possible to reduce the consumption of the gas adsorbent.

Further, in the gas-adsorbing device of the exemplary embodiment, there is no need to start gas adsorption by performing a communication process such that the inside and the outside of the container communicate with each other after the gas-adsorbing device is applied to the space having the gas as the adsorption target, and thus it is possible to reduce the man-hours when the gas-adsorbing device is applied to the space having the gas as the adsorption target.

(Fourth Exemplary Embodiment)

Next, the fourth exemplary embodiment of the present invention will be described.

Figure 7:
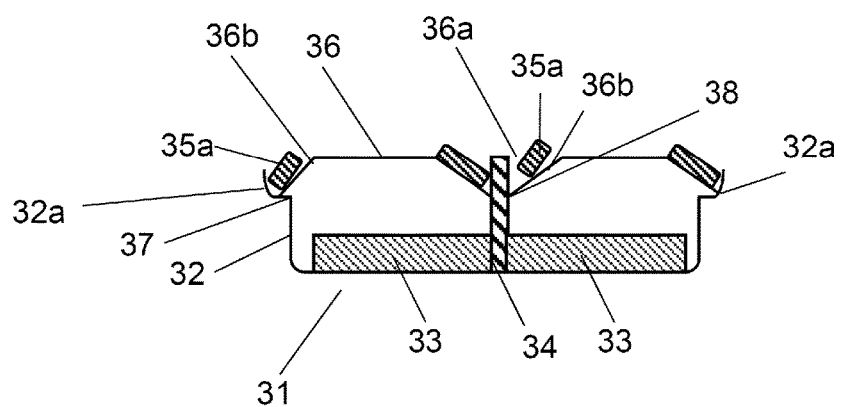
FIG. 7 is a sectional view showing a configuration of a gas-adsorbing device, before a heat treatment, according to a fourth exemplary embodiment of the present invention.

FIG. 7 is a sectional view showing a configuration of gas-adsorbing device 31, before a heat treatment, according to the fourth exemplary embodiment of the present invention.

In FIG. 7, gas-adsorbing device 31 includes container 32, gas adsorbent 33, aeration member 34, joining material 35a, and lid 36. Lid 36 has slope portion 36b formed to slope in the vicinities of both of contact point 37 between container 32 and lid 36, and contact point 38 between aeration member 34 and lid 36. As shown in FIG. 7, in the sectional view, V shapes are formed with contact points 37 and 38 as the lowest points of slope portions 36b, respectively.

Aeration member 34 projects to the outside of container 32 and lid 36 through hole 36a of lid 36.

Note that, in the following description, container 32 and lid 36 are collectively referred to as a container in some cases.

Note that the exemplary embodiment, a fifth exemplary embodiment, and a sixth exemplary embodiment, which will be described below, are described with reference to sectional views. Container 32 and lid 36 have a pot shape such as a circular shape or a rectangular shape in a plan view. Gas adsorbent 33 may have a shape such as a disk shape or a rectangular shape. Aeration member 34 may has a shape such as a circular cylindrical shape, a prismatic shape, or a wall shape.

Figure 8:
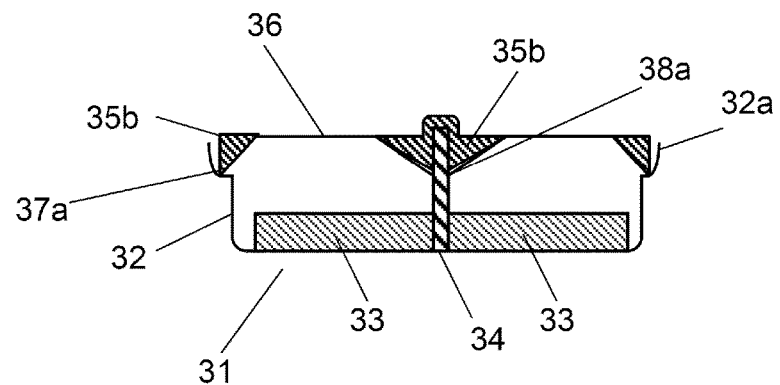
FIG. 8 is a sectional view showing a configuration of the gas-adsorbing device, after the heat treatment, according to the fourth exemplary embodiment of the present invention.

FIG. 8 is a sectional view showing a configuration of gas-adsorbing device 31, after the heat treatment, according to the fourth exemplary embodiment of the present invention.

As shown in FIG. 8, joining material 35a flows into portions having, in the sectional view, the V shapes formed between container 32 and lid 36, and between aeration member 34 and lid 36, respectively. In this manner, joining layer 35b is formed. Container 32 and lid 36, and aeration member 34 and lid 36 are joined with formed joining layer 35b. Hence, joining portion 37a between container 32 and lid 36, and joining portion 38a between aeration member 34 and lid 36 are both covered with joining layer 35b.

Further, a front surface of aeration member 34 is covered with joining layer 35b. Therefore, even when the gas adsorbent is stored in the atmosphere, a gas dose not reach gas adsorbent 33 through aeration member 34 and thus it is possible to reduce degradation. In the state in which the heat treatment is not performed as shown in FIG. 7, gas adsorbent 33 does not adsorb a gas. Therefore, even when gas adsorbent 33 is handled in the atmosphere, gas adsorbent 33 is not degraded due to the adsorption of the gas.

In gas-adsorbing device 31 shown in FIG. 8, the projecting portion of joining layer 35 is removed when the gas-adsorbing device is used (to be described in detail below, refer to FIG. 11).

Next, an example of a manufacturing method of gas-adsorbing device 31 of the fourth exemplary embodiment will be described.

First, as shown in FIG. 7, gas adsorbent 33 is disposed in container 32, lid 36 and aeration member 34 are disposed, and then, joining material 35a is disposed.

Then, after the members of gas-adsorbing device 31 set as described above are disposed in the vacuum heating furnace and the pressure therein is reduced, heating is performed to the activation temperature of gas adsorbent 33, and activation treatment is performed.

At this time, since sufficient flowability is imparted to joining material 35a, melted joining material 35a flows in along the slope of lid 36. Further, melted joining material 35a is disposed in advance such that melted joining material 35a covers the front surface of aeration member 34. Then, the members of gas-adsorbing device 31 are cooled while the reduced pressure is maintained, and thereby joining material 35a is solidified so as to become joining layer 35b. Container 32 and lid 36, and aeration member 34 and lid 36 are joined with joining layer 35b. Further, aeration member 34 covers joining layer 35b and gas-adsorbing device 31 has a configuration shown in FIG. 8.

In the state in FIG. 8, since gas adsorbent 33 is disposed in a space formed by container 32, joining layer 35b, and lid 36, no air permeates from the outside and thus, the amount of the adsorption is not degraded even when the gas adsorbent is stored in the atmosphere for a long period of time.

Container 32 of the exemplary embodiment has a volume in which a predetermined amount of gas adsorbent 33 can be disposed, can withstand a temperature of a melting-point heat treatment of joining material 35a, and has gas barrier properties such that little air permeates in the container even when the container is stored in the atmosphere. An upper temperature limit of container 32 is required to be higher than the temperature of the heat treatment of gas adsorbent 33, and the temperature at which joining material 35a starts to flow. Hence, as a material of container 32, for example, a material selected from metal, an inorganic material such as glass, ceramics, and the like.

As gas adsorbent 33, it is possible to use a material having gas adsorption properties such as various adsorbents obtained by chemical adsorption or physical adsorption, for example, various metal getters or zeolite. Further, as gas adsorbent 33, it is desirable to use a material that can obtain adsorption properties by being subjected to heat treatment during the pressure reduction.

As joining material 35a, it is desirable to use glass whose material has thermoplasticity and can obtain flowability at a temperature about the temperature of the heat treatment of gas adsorbent 33. Glass is a non-crystalline material made of an inorganic substance, and is made of a thermoplastic substance, and main components of glass are boron oxide, silicon oxide, bismuth oxide, and the like.

It is desirable that aeration member 34 is made of a material of which the aeration rate very little changes in a case of being heated to the temperature at which joining material 35a starts to flow. For example, as the aeration member, it is desirable to use a material as an inorganic porous material obtained by sintering powder of ceramics or glass. For example, as a material of aeration member 34, it is desirable to use glass having the softening temperature higher than the softening temperature of joining layer 35b by 100° C. or higher, and preferably by 150° C. or higher. Further, as a material of aeration member 34, in order to reduce the degradation of gas adsorbent 33 in the atmosphere, it is desirable that the aeration rate is 0.5 cc/mim or lower, preferably, 0.3 cc/mim or lower, more preferably, 0.1 cc/mim or lower.

The inorganic porous material is formed of an inorganic material such as glass, ceramics, or carbon and has penetrating holes for communicating with the air.

In this specification, "slope" means that a portion of lid 36, in which joining material 35a is disposed, slopes with respect to a vertical direction. In other words, when joining material 35a is melted, a shape of flowing of joining material 35a due to the gravity toward joining portions 37a and 38a between lid 36 and container 32, and between lid 36 and aeration member 34, respectively, is referred to as the "slope".

As shown in FIGS. 7, 8, and the like, in the sectional views, a V shape is formed by wall surface 32a of container 32 and slope portion 36b of lid 36. In the V shape, a portion having an acute angle is the lower side in the direction of gravitational force, that is, in the vertical direction, and joining material 35a in a melting state flows in the portion having the acute angle of the V shape due to the gravity and then is efficiently accumulated.

Lid 36 covers an opening of container 32, and a space is formed by container 32, aeration member 34, and joining layer 35b obtained when joining material 35a is melted and then is solidified. Hence, permeation of air is reduced even when gas-adsorbing device 31 is stored in the air. As a material of lid 36, for example, it is possible to use a material selected from metal and an inorganic material such as glass and ceramics, and, in consideration of efficiency of production, it is desirable that lid is made of the same material as container 32.

In addition, in the exemplary embodiment, the space formed by container 32, aeration member 34, joining layer 35b, and lid 36 is completely enclosed by container 32, aeration member 34, joining layer 35b, and lid 36, and has a volume that can accommodate a required amount of gas adsorbent 33.

In this configuration described above, very little air reaches gas adsorbent 33 even when gas-adsorbing device 31 is stored in the atmosphere and thus, degradation of gas adsorbent 33 is reduced. As a result, since gas adsorbent 33 can adsorb a large amount of air as the adsorption target present inside the evacuated insulating material, it is possible to sufficiently reduce the inner pressure of the evacuated insulating material. Hence, it is possible to attain gas-adsorbing device 31 that can achieve a good heat insulation performance.

(Fifth Exemplary Embodiment)

Next, the fifth exemplary embodiment of the present invention will be described.

Figure 9:
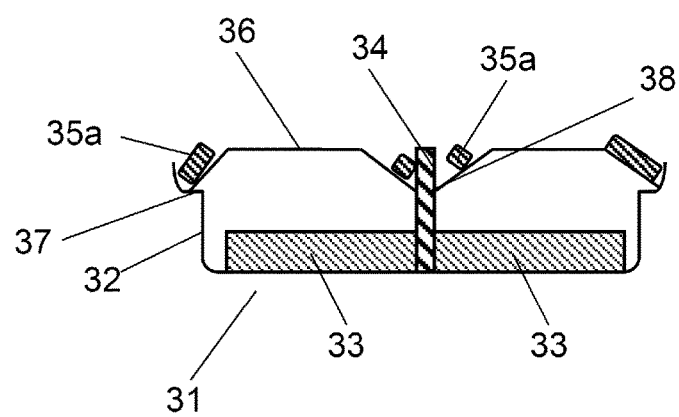
FIG. 9 is a sectional view showing a configuration of a gas-adsorbing device, before a heat treatment, according to a fifth exemplary embodiment of the present invention.

FIG. 9 is a sectional view showing a configuration of gas-adsorbing device 31, before a heat treatment, according to the fifth exemplary embodiment of the present invention.

In FIG. 9, gas-adsorbing device 31 includes container 32, gas adsorbent 33, aeration member 34, joining material 35a, and lid 36. Lid 36 slopes in the vicinities of both of contact point 37 between container 32 and lid 36, and contact point 38 between aeration member 34 and lid 36 such that V shapes are formed with contact points 37 and 38 as the lowest points of the slopes, respectively.

Figure 10:
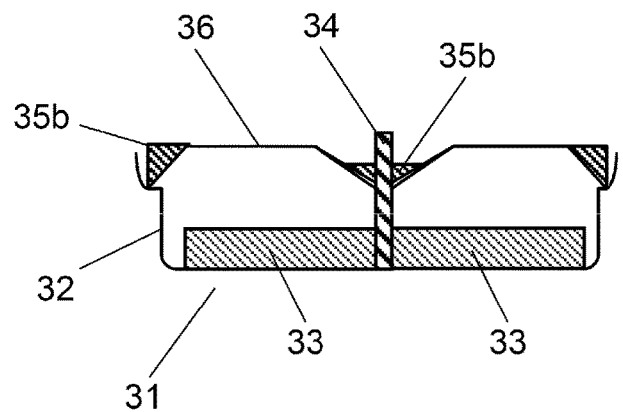
FIG. 10 is a sectional view showing a configuration of the gas-adsorbing device, after the heat treatment, according to the fifth exemplary embodiment of the present invention.

FIG. 10 is a sectional view showing a configuration of gas-adsorbing device 31, after the heat treatment, according to the fifth exemplary embodiment of the present invention.

As shown in FIG. 10, joining material 35a flows into portions having the V shapes, in the sectional view, formed between container 32 and lid 36, and between aeration member 34 and lid 36, respectively, and thereby joining layer 35b is formed. Container 32 and lid 36, and aeration member 34 and lid 36 are joined with formed joining layer 35b.

Gas-adsorbing device 31 of the exemplary embodiment has the configuration common to gas-adsorbing device 31 of the fourth exemplary embodiment except that a part of aeration member 34 is not covered with joining layer 35b and thus is in contact with air on the outside of container 32.

In the state in which the heat treatment is not performed as shown in FIG. 9, gas adsorbent 33 does not adsorb a gas. Therefore, even when gas adsorbent 33 is handled in the atmosphere, gas adsorbent 33 is not degraded due to the adsorption of the gas. Gas adsorbent 33 is subjected to the heat treatment under the reduced pressure, and thereby the adsorption properties is imparted to the gas adsorbent.

After the heat treatment shown in FIG. 10, gas adsorbent 33 is likely to be degraded when being brought into contact with the atmosphere. Therefore, gas-adsorbing device 31 is required to be sealed in any container without bringing gas adsorbent 33 into contact with the atmosphere. As a method of sealing gas adsorbent 33, there is a method in which gas-adsorbing device 31 is sealed in a laminate film having the gas barrier properties in the vacuum. In this case, when gas-adsorbing device is used to increase a degree of vacuum of the evacuated insulating material, gas-adsorbing device 31 is taken out from the laminate film so as to be used.

Here, an example of a manufacturing method of gas-adsorbing device 31 of the exemplary embodiment is described.

First, container 32 is filled with gas adsorbent 33, lid 36 and aeration member 34 are disposed, and then, joining material 35a is disposed.

Next, after the members of gas-adsorbing device 31 set as described above are disposed in the vacuum heating furnace, the pressure therein is reduced, heating is performed to the activation temperature of gas adsorbent 33, and activation treatment is performed.

At this time, since sufficient flowability is imparted to joining material 35a, melted joining material 35a flows in along the V-shaped slope of lid 36. Then, the members are cooled while the reduced pressure is maintained, and thereby joining material 35a is solidified so as to become joining layer 35b. Container 32 and lid 36, and aeration member 34 and lid 36 are joined with joining layer 35b. In this manner, gas-adsorbing device 31 enter the state shown in FIG. 10.

In this state, since gas-adsorbing device 31 can adsorb air, the gas-adsorbing device adsorbs air by being applied to the evacuated insulating material such that it is possible to improve the degree of vacuum of the evacuated insulating material, and it is possible to attain an evacuated insulating material having a good heat insulation performance.

(Sixth Exemplary Embodiment)

Next, the sixth exemplary embodiment of the present invention will be described.

Figure 11:
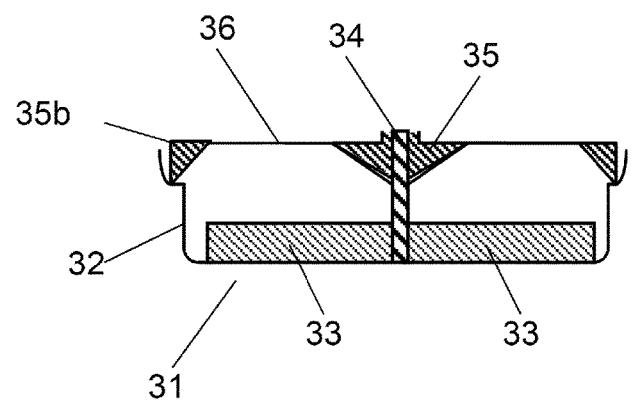
FIG. 11 is a sectional view showing a configuration obtained after a part of a joining layer of the gas-adsorbing device shown in FIG. 7 is removed, according to a sixth exemplary embodiment of the present invention.

FIG. 11 is a sectional view showing a configuration obtained after a part of joining layer 35b of gas-adsorbing device 31 shown in FIG. 8 is removed, according to the sixth exemplary embodiment of the present invention.

As shown in FIG. 11, in gas-adsorbing device 31 described in the fourth embodiment, a part of joining layer 35b covering aeration member 34 is removed, and thereby air reaches gas adsorbent 33 through aeration member 34.

Figure 12:
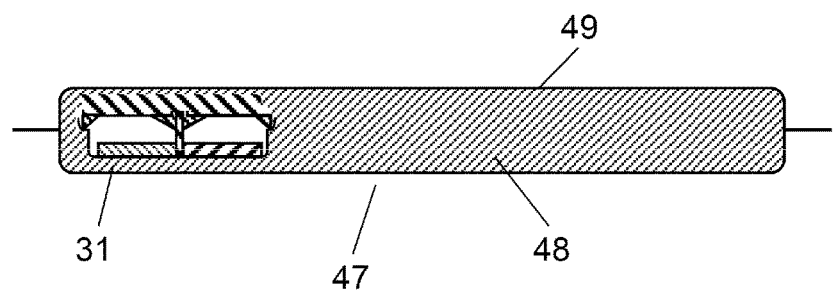
FIG. 12 is a sectional view of an evacuated insulating material to which the gas-adsorbing device is applied, according to the sixth exemplary embodiment of the present invention.

FIG. 12 is a sectional view of evacuated insulating material 47 to which gas-adsorbing device 31 is applied, according to the sixth exemplary embodiment of the present invention.

An example of a manufacturing method of evacuated insulating material 47 of the sixth exemplary embodiment is described.

As shown in FIG. 12, in evacuated insulating material 47, core 48 and gas-adsorbing device 31, in which a part of joining layer 35b covering aeration member 34 is removed, are disposed inside jacket 49 having the gas barrier properties. After the pressure inside jacket 49 of evacuated insulating material 47 is reduced in a chamber or the like to which a vacuum pump is connected, an opening of jacket 49 is sealed, and then evacuated insulating material 47 is manufactured.

At the time when jacket 49 is sealed, a slight amount of air, which is not completely removed by the vacuum pump, remains inside jacket 49. In gas-adsorbing device 31, gas adsorbent 33 adsorbs and removes the air through aeration member 34, and thus the pressure in jacket 49 is reduced, thereby making it possible to improve the heat insulation performance of evacuated insulating material 47.

As core 48, it is possible to use a material selected from an open-cell foam made of a polymer such as polystyrene, polyurethane, or the like, an open-cell foam made of an inorganic material, inorganic and organic powder, inorganic and organic fibrous materials, and the like. In addition, it is possible to use a composite of the above materials as core 48.

As jacket 49, it is possible to use a material having gas barrier properties, and it is possible to use a various materials and composite materials, which can inhibit permeation of air, such as a metal case or a glass case, a gas barrier case formed by stacking a resin and metal, and a laminate film configured of a surface protecting layer, a gas barrier layer, and a heat adhesion layer.

As a simple method, it is possible to use the following method. Jacket 49 is prepared by using an envelope-like laminate film of which three sides with the heat adhesion layer is heated and sealed. Then, core 48 and gas-adsorbing device 31 is inserted inside jacket 49, then, jacket 49 is disposed in a vacuum chamber, and an opening on one remaining side of jacket 49 is heated and sealed under the reduced pressure.

In the sixth exemplary embodiment, gas-adsorbing device 31 is applied to evacuated insulating material 47 after being handled in the atmosphere. As long as the gas-adsorbing device is handled in the atmosphere for a short time, gas adsorbent 33 is slightly degraded due to the adsorption of the atmosphere. Hence, it is possible for gas-adsorbing device 31 to adsorb a large amount of air in evacuated insulating material 47.

Note that, as a method of removing joining layer 35b, it is possible to use mechanical polishing by a method selected from a metal file, sand paper, a drill, a grinder, or the like.

Hereinafter, gas-adsorbing devices 31 manufactured by changing conditions in Examples 10 to 15 according to sixth embodiment, and evacuated insulating materials 47, to which the gas-adsorbing devices are applied, will be described. Additionally, Comparative Examples 1 to 3 will be described.

In Examples 10 to 15 and Comparative Examples 1 to 3, in order to evaluate effects of gas-adsorbing device 31, the same components of gas-adsorbing device 31 are used except for aeration member 34.

In addition, a manufacturing method is as follows.

A stainless steel container having a thickness of 0.3 mm is used as container 32, copper ion-exchanged ZSM-5-type zeolite is used as gas adsorbent 33, glass is used as joining material 35a, and a stainless steel lid having a thickness of 0.3 mm is used as lid 36.

After the members of the gas-adsorbing device are assembled in the atmosphere, the members are disposed in the vacuum heating furnace such that gas adsorbent 33 is activated, and joining material 35a is melted and then cooled, thereby manufacturing gas-adsorbing device 31.

Glass wool laminate is used as core 48, an envelope obtained by heating and sealing three sides of a laminate film configured of a nylon film layer, an aluminum foil layer, and a polyethylene layer is used as the jacket. Core 48 and gas-adsorbing device 31 are disposed inside the envelope of jacket 49, vacuuming is performed to 10 Pa in a vacuum chamber, then, one remaining side of jacket 49 is heated and sealed, thereby manufacturing evacuated insulating material 47.

In addition, evacuated insulating material 47 has a longitudinal length of 900 mm, a width of 300 mm, and a thickness of 5 mm.

As evaluation of the aeration rate of aeration member 34, evaluation of an amount of nitrogen adsorption of gas-adsorbing device 31, and evaluation of thermal conductivity of evacuated insulating material 47 are performed, respectively.

A flow meter manufactured by Horiba Stec is used for measurement of the aeration rate of aeration member 34, Autosorb manufactured by Quantachrome Instruments is used for measurement of an amount of the nitrogen adsorption of gas-adsorbing device 31, and Auto-Lambda manufactured by EKO Instruments is used for measurement of the thermal conductivity of evacuated insulating material 47.

The evaluation of the thermal conductivity is performed by including evaluation of the initial thermal conductivity measured after the manufacturing of evacuated insulating material 47, and evaluation after the evacuated insulating material is stored in a constant temperature furnace at 80° C. for 200 days and an air flowing rate, at which air permeates inside jacket 49 through jacket 49 with time, is accelerated. In a case of using jacket 49 in Example, the storing at 80° C. for 200 days corresponds to storing at room temperature for about four years.

Figures 14, 15:
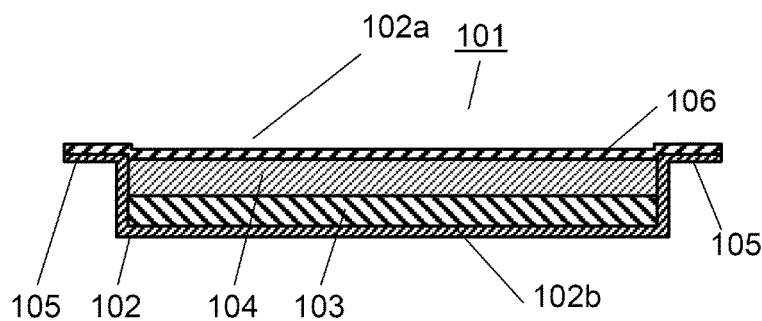
FIG. 14 is a table showing conditions and evaluation results of Comparative Examples 1 to 3 according to the sixth exemplary embodiment of the present invention.
FIG. 15 is a view showing another example of a sectional configuration of an aeration member of an exemplary embodiment of the present invention.

FIG. 13 is a table showing conditions and evaluation results of Examples 10 to 15 of gas-adsorbing device 31 according to the sixth exemplary embodiment of the present invention. In addition, FIG. 14 is a table showing conditions and evaluation results of Comparative Examples 1 to 3 according to the same exemplary embodiment.

(Example 10)

In Example 10, gas-adsorbing device 31 shown in FIG. 11 is used. As gas adsorbent 33, 1.5 g of copper ion-exchanged ZSM-5-type zeolite is used. In addition, pressed and sintered glass powder is used as aeration member 34. The members, container 32, lid 36, and joining material 35a are assembled in the atmosphere, then, are subjected to heat treatment of activation, and are subjected to heat treatment of sealing, thereby manufacturing gas-adsorbing device 31.

An angle of the slope of lid 36 is 30°, and a cross section of a contact portion between lid 36 and container 32 has a V shape. Further, when container 32 and lid 36 are joined, an amount of joining material 35a required for obtaining a sufficient yield ratio is 0.3 g or larger.

The aeration rate of aeration member 34 is 0.1 cc/min.

In gas-adsorbing device 31, a result of 3.5 cc/g is obtained by measuring an amount of nitrogen adsorption immediately after joining layer 35b covering aeration member 34 is removed.

The initial thermal conductivity of evacuated insulating material 47 to which gas-adsorbing device 31 is applied and the thermal conductivity thereof obtained after 200 days are 0.0020 W/mK, and 0.0020 W/mK, respectively, which are lower than those of Comparative Examples 1 to 3 to be described below, and thus it is found that good heat insulation performance is achieved.

(Example 11)

In Example 11, gas-adsorbing device 31 shown in FIG. 10 is used. As gas adsorbent 33, 1.5 g of copper ion-exchanged ZSM-5-type zeolite is used, and pressed and sintered glass powder is used as aeration member 34. The members, container 32, lid 36, and joining material 35a are assembled in the atmosphere, then, are subjected to heat treatment of activation, and are subjected to heat treatment of sealing, thereby manufacturing gas-adsorbing device 31.

An angle of the slope of lid 36 is 30°, and a cross section of a contact portion between lid 36 and container 32 has a V shape. Further, when container 32 and lid 36 are joined, an amount of joining material 35a required for obtaining a sufficient yield ratio is 0.3 g or larger.

The aeration rate of aeration member 34 is 0.1 cc/min.

In gas-adsorbing device 31, a result of 2.5 cc/g is obtained by measuring an amount of nitrogen adsorption after joining layer 35b covering aeration member 34 is removed and the gas-adsorbing device remains in the atmosphere for ten minutes. The amount of the adsorption is decreased by 1 cc, compared to Example 10. It is considered that this is because 1 cc of air passes through aeration member 34 having the aeration rate of 0.1 cc/min for ten minutes and the air is adsorbed on gas adsorbent 33.

The initial thermal conductivity of evacuated insulating material 47 to which gas adsorbent 33 is applied and the thermal conductivity thereof obtained after 200 days are 0.0020 W/mK, and 0.0020 W/mK, respectively, which are lower than those of Comparative Examples 1 to 3, and thus it is found that good heat insulation performance is achieved.

Here, the initial thermal conductivity of evacuated insulating material 47 to which gas adsorbent 33 is applied and the thermal conductivity thereof obtained after 200 days are the same as those in Example 10 in which a remaining amount of adsorption measured when the gas adsorbent is applied to evacuated insulating material 47 is larger. The reason is that, since a sum of an amount of air permeation after 200 days added to the initial amount of remaining air is 2.5 cc or less, the thermal conductivity is the same as long as the remaining amount of adsorption is 2.5 cc or larger.

(Example 12)

In Example 12, gas-adsorbing device 31 shown in FIG. 11 is used. As gas adsorbent 33, 1.5 g of copper ion-exchanged ZSM-5-type zeolite is used, and pressed and sintered glass powder is used as aeration member 24. The members, container 32, lid 36, and joining material 35a are assembled in the atmosphere, then, are subjected to heat treatment of activation, and are subjected to heat treatment of sealing, thereby manufacturing gas-adsorbing device 31.

An angle of the slope of lid 36 is 30°, and a cross section of a contact portion between lid 36 and container 32 has a V shape. Further, when container 32 and lid 36 are joined, an amount of joining material 35a required for obtaining a sufficient yield ratio is 0.3 g or larger.

The aeration rate of aeration member 34 is 0.1 cc/min.

In gas-adsorbing device 31, a result of 1.5 cc/g is obtained by measuring an amount of nitrogen adsorption after joining layer 35b covering aeration member 34 is removed and the gas-adsorbing device remains in the atmosphere for 20 minutes. The amount of the adsorption is decreased by 2 cc, compared to Example 10. It is considered that this is because 2 cc of air passes through aeration member 24 having the aeration rate of 0.1 cc/min for 20 minutes and the air is adsorbed on gas adsorbent 23.

The initial thermal conductivity of evacuated insulating material 47 to which gas adsorbent 23 is applied and the thermal conductivity thereof obtained after 200 days are 0.0020 W/mK, and 0.0025 W/mK, respectively, which are lower than those of Comparative Examples 1 to 3, and thus it is found that good heat insulation performance is achieved.

This is because the remaining amount of adsorption of gas-adsorbing device 31 measured when the gas-adsorbing device is applied to evacuated insulating material 47 is sufficient to adsorb the remaining air. The inner pressure inside jacket 49 is the same as that in Examples 10 and 11, and the same thermal conductivity is achieved. By contrast, since there is no remaining amount of adsorption sufficient to be used for adsorbing the entire permeating air for 200 days, the inner pressure is increased due to the air that is not adsorbed, and thereby the thermal conductivity increases.

(Example 13)

In Example 13, gas-adsorbing device 31 shown in FIG. 11 is used. As gas adsorbent 33, 1.5 g of copper ion-exchanged ZSM-5-type zeolite is used, and pressed and sintered glass powder is used as aeration member 34. The members, container 32, lid 36, and joining material 35a are assembled in the atmosphere, then, are subjected to heat treatment of activation, and are subjected to heat treatment of sealing, thereby manufacturing gas-adsorbing device 31.

An angle of the slope of lid 36 is 30°, and a cross section of a contact portion between lid 36 and container 32 has a V shape. Further, when container 32 and lid 36 are joined, an amount of joining material 35a required for obtaining a sufficient yield ratio is 0.3 g or larger.

The aeration rate of aeration member 34 is 0.1 cc/min.

In gas-adsorbing device 31, a result of 0.5 cc/g is obtained by measuring an amount of nitrogen adsorption after joining layer 35b covering aeration member 34 is removed and the gas-adsorbing device remains in the atmosphere for 30 minutes. The amount of the adsorption is decreased by 3 cc, compared to Example 10. It is considered that this is because 3 cc of air passes through aeration member 34 having the aeration rate of 0.1 cc/min for 30 minutes and the air is adsorbed on gas adsorbent 33.

The initial thermal conductivity of evacuated insulating material 47 to which gas adsorbent 33 is applied and the thermal conductivity thereof obtained after 200 days are 0.0020 W/mK, and 0.0040 W/mK, respectively, which are lower than those of Comparative Examples 1 to 3, and thus it is found that good heat insulation performance is achieved.

This is because the remaining amount of adsorption of gas-adsorbing device 31 measured when the gas-adsorbing device is applied to evacuated insulating material 47 is sufficient to adsorb the remaining air. The inner pressure inside jacket 49 is the same as that in Examples 10 to 12, and the same thermal conductivity is achieved. By contrast, since there is no remaining amount of adsorption sufficient to be used for adsorbing the entire permeating air for 200 days, the inner pressure is increased due to the air that is not adsorbed, and thereby the thermal conductivity increases.

(Example 14)

A configuration and a material of gas-adsorbing device 31 according to Example 14 are the same as the configuration and the material of gas-adsorbing device 31 of Example 10 except for the angle of the slope of lid 36.

The angle of the slope of lid 36 is 45°, and a cross section of a contact portion between lid 36 and container 32 has a V shape. Further, when container 32 and lid 36 are joined, an amount of joining material 35a required for obtaining a sufficient yield ratio is 0.1 g or larger.

Compared to Example 10, the amount of joining material 35a required for the sufficient yield ratio is decreased. The reason is that, since the slope is steeper than in Example 10, joining material 35a is efficiently accumulated in the joining portion.

In gas-adsorbing device 31, a result of 3.5 cc/g is obtained by measuring an amount of nitrogen adsorption immediately after joining layer 35b covering aeration member 34 is removed.

The initial thermal conductivity of the evacuated insulating material 47 to which gas-adsorbing device 31 is applied and the thermal conductivity thereof obtained after 200 days are 0.0020 W/mK, and 0.0020 W/mK, respectively, which are lower than those of Comparative Examples 1 to 3, and thus it is found that good heat insulation performance is achieved.

(Example 15)

A configuration and a material of gas-adsorbing device 31 according to Example 15 are the same as those of gas-adsorbing device 31 of Example 10 except for the material of aeration member 34.

Pressed and sintered ceramic powder is used as aeration member 34. The aeration rate of aeration member 34 is 0.1 cc/min. In gas-adsorbing device 31, a result of 3.5 cc/g is obtained by measuring an amount of nitrogen adsorption immediately after joining layer 35b covering aeration member 34 is removed. It is found that, even when the material of aeration member 34 is different, the amount of the adsorption is the same in a case where the aeration rate is the same.

The initial thermal conductivity of evacuated insulating material 47 to which gas-adsorbing device 31 is applied and the thermal conductivity thereof obtained after 200 days are 0.0020 W/mK, and 0.0020 W/mK, respectively, which are lower than those of Comparative Examples 1 to 3, and thus it is found that good heat insulation performance is achieved.

Next, Comparative Examples will be described.

(Comparative Example 1)

In Comparative Example 1, a gas-adsorbing device is manufactured to have a configuration in which an open-top container formed of a gas impermeable material is filled with 1.5 g of copper ion-exchanged ZSM-5-type zeolite, and powder of a dry material is disposed in the upper portion of the container so as to cover the copper ion-exchanged ZSM-5-type zeolite.

In the gas-adsorbing device, a result of 3.5 cc/g is obtained by measuring an amount of nitrogen adsorption immediately after the gas-adsorbing device is manufactured. Further, a result of 0.1 cc/g is obtained by measuring the amount of the nitrogen adsorption after the gas-adsorbing device remains in the atmosphere for ten minutes.

Evaluation of the thermal conductivity is performed after the gas-adsorbing device remains in the atmosphere for ten minutes and is applied to the evacuated insulating material.

The initial thermal conductivity of the evacuated insulating material to which the gas-adsorbing device is applied and the thermal conductivity thereof obtained after 200 days are 0.0022 W/mK, and 0.0050 W/mK, respectively, which are higher than those of Examples 10 to 15. The reasons are as follows. Since the powder of the dry material has high gas permeability, highly active copper ion-exchanged ZSM-5-type zeolite adsorbs air when the gas-adsorbing device remains in the atmosphere. Thus, it is considered that a certain amount of the initial amount of adsorption is maintained; however, the amount is insufficient so as to have the same inner pressure of the evacuated insulating material as that in Examples 10 to 15.

(Comparative Example 2)

In Comparative Example 2, the gas-adsorbing device is manufactured by employing the configuration of Example 10 without using joining layer 35b and then, evaluation is performed.

In the gas-adsorbing device, as a result of evaluation of an amount of nitrogen adsorption immediately after the manufacturing of the gas-adsorbing device, the amount of the nitrogen adsorption is 0.05 cc. Compared to Example 10, the amount of the nitrogen adsorption is significantly decreased. It is considered that this is because, without joining layer 35b, the air permeates through gaps between container 32 and lid 36, and between aeration member 34 and lid 36, respectively and almost the entire amount of adsorption of gas adsorbent 33 is consumed to adsorb the air.

The initial thermal conductivity of the evacuated insulating material to which the gas-adsorbing device is applied and the thermal conductivity thereof obtained after 200 days are 0.0025 W/mK, and 0.0053 W/mK, respectively, which are higher than the thermal conductivity of Examples 10 to 15. It is considered that this is because a certain amount of the initial amount of adsorption is maintained; however, the amount is insufficient so as to have the same inner pressure of the evacuated insulating material as that in Examples 10 to 15.

(Comparative Example 3)

In Comparative Example 3, the gas-adsorbing device is manufactured by employing the configuration of Example 11 without using joining layer 35b and then, evaluation is performed.

As a result of evaluation of an amount of nitrogen adsorption after the gas-adsorbing device remains in the atmosphere for ten minutes, the amount of the nitrogen adsorption is 0 cc. Compared to Example 11, the amount of the nitrogen adsorption is significantly decreased. It is considered that this is because joining layer 35b is not used, and thus the air permeates through gaps between the container and the lid, and between the aeration member and the lid, respectively and almost the entire amount of adsorption of the gas adsorbent is consumed to adsorb the air while the gas-adsorbing device remains for ten minutes.

The initial thermal conductivity of the evacuated insulating material to which the gas-adsorbing device is applied and the thermal conductivity thereof obtained after 200 days are 0.0030 W/mK, and 0.0059 W/mK, respectively, which are higher than the thermal conductivity of any one of Examples 10 to 15 and Comparative Examples 1 and 2. It is considered that this is because the initial amount of adsorption is not maintained and thus it is not possible for the inner pressure of the evacuated insulating material to be reduced.

As described above, according to the exemplary embodiments, it is possible to attain the gas-adsorbing device in which it is possible to reduce consumption of the gas adsorbent due to the contact with air, even when the gas-adsorbing device is handled in air. As a result, it is possible to adsorb a large amount of a gas which needs to be adsorbed.

Further, after the gas-adsorbing device of the exemplary embodiment is applied to the evacuated insulating material, there is no need to form a through-hole in the container of the gas-adsorbing device in order to adsorb the gas in the evacuated insulating material. Hence, it is possible to reduce the man-hours when the gas-adsorbing device is applied to the evacuated insulating material.

Note that, in the exemplary embodiments described above, as aeration members 4, 14, 24, and 34, use of the material adjusted to have the appropriate aeration properties by sintering the powder of ceramics, glass, or the like, that is, a sintered porous body made of an inorganic material, is described. However, the aeration member of the present invention is not limited to this example.

FIG. 15 is a view showing another example of a sectional configuration of the aeration member of the exemplary embodiment of the present invention.

In the example shown in FIG. 15, a (organic) sintered porous body made of a resin is used as aeration member 104. Gas-adsorbing device 101 shown in FIG. 15 includes container 102, gas adsorbent 103, and aeration member 104 formed of a sintered body made of a resin.

Container 102 has a flange 105 in an outward orientation on both end portions (circumferential portion in a plan view when container 102 has a circular cylindrical shape) in a sectional view. Then, film 106 having the gas barrier properties is disposed between flanges 105 so as to cover gas adsorbent 103 such that container 102 is maintained to be airtight. Film 106 is bonded to flange 105 by adhesion or welding to the flange.

Container 102 has a cylindrical shape having opening 102a and bottom portion 102b. Gas adsorbent 103 is configured to be disposed in container 102 so as to adsorb a gas. Aeration member 104 has a predetermined aeration rate. Gas adsorbent 103 is disposed in a space formed by container 102 and aeration member 104.

As gas adsorbent 103, it is possible to use the material described in the exemplary embodiments. Here, zeolite is used and description thereof is performed.

As a material of a resin of the porous body that forms aeration member 104, it is possible to use an olefin resin selected from low-density polyethylene (LDPE), high-density polyethylene (HDPE), ultrahigh molecular weight polyethylene, polypropylene (PP), or the like. In addition, it is also possible to use a resin selected from (meth) acrylic resin such as polymethylmethacrylate, a fluororesin such as tetrafluoroethylene, polystyrene (PS), polycarbonate (PC), and polyether ether ketone (PEEK).

Note that, when moisture is released from the resin, the adsorption capability of gas adsorbent 103 is consumed, and thus it is more preferable to use a resin that does not contain a hydrophilic functional group in a molecular chain, such as olefin resin.

The adsorption performance is imparted gas-adsorbing device 101 by a pressure-reduction heating treatment, container 102 is filled with zeolite as gas adsorbent 103 and aeration member 104, a lid is disposed in container 102 by a film 106, and then manufacturing is performed.

At this time, the inside of container 102 is sealed in a state of the reduced pressure. When sealing is performed, there is no need to perform the heat treatment at a high temperature. It is possible to seal container 102 and film 106 as a lid by thermal adhesion at a temperature in a range of 100 to 300° C. based on a material of film 106 having the gas barrier properties. In addition, adhesion may be performed with an adhesive without using the thermal adhesion.

According to gas-adsorbing device 101 having such a configuration, there is no need to perform the heat treatment at a high temperature in the sealing process, an thus, as the material of container 102, it is possible to use a resin, in addition to metal or an inorganic material selected from glass, ceramics, and the like.

In addition, in a case where film 106, and container 102 and aeration member 104 adheres to each other, it is possible to perform strong heat adhesion by selecting, as aeration member 104, a thermoplastic resin compatible with the adhesion layer of film 106. In this case, since surfaces adhere, it is possible to realize an integral configuration without a space between film 106 and aeration member 104.

As described above, the gas-adsorbing device of the exemplary embodiment includes the container, the gas adsorbent configured to be disposed inside the container so as to adsorb the gas, and an aeration member having a predetermined aeration rate. Further, the gas adsorbent is disposed in the space formed by the container and the aeration member.

In this configuration, even in a case where copper ion-exchanged ZSM-5-type zeolite, which has a high gas adsorption capacity and a high gas adsorption rate, is used as the gas adsorbent, the gas, which needs to be adsorbed, reaches gas adsorbent through the aeration member. The aeration member is a material having the aeration properties by adjusting at least one of the diameter or the length of the path, through which the gas passes. The aeration rate of the aeration member is controlled, thereby making it possible to reduce the consumption of the gas adsorbent due to the contact with the air, and making it possible to adsorb a large amount of the gas which needs to be adsorbed.

Further, in the case where the gas-adsorbing device and the moisture adsorbent are disposed in the evacuated insulating material, the moisture adsorbent is also used in the space having the gas as the adsorption target, and thereby the moisture adsorbent preferentially adsorbs the moisture even in a case where moisture is contained in the gas as the adsorption target. Therefore it is possible to reduce a probability that the gas adsorbent adsorbs the moisture. In other words, the moisture adsorbent directly adsorbs the moisture in the space containing the moisture; however, the gas adsorbent adsorbs the moisture through the aeration member. Therefore, the aeration rate of the aeration member is set to the appropriate value, the probability that the moisture is adsorbed on the moisture adsorbent is remarkably higher than the probability that the moisture is adsorbed on the gas adsorbent through the aeration member, and thus, it is possible to reduce the consumption of the gas adsorbent.

Further, in the gas-adsorbing device, there is no need to start gas adsorption by performing a communication process such that the inside and the outside of the container communicate with each other after the gas-adsorbing device is applied to the space having the gas as the adsorption target, and thus it is possible to reduce the man-hours when the gas-adsorbing device is applied to the space having the gas as the adsorption target.

In addition, the space may be configured to be completely enclosed by the container and the aeration member.

In this configuration, it is possible to further reduce the consumption of the gas adsorbent due to the contact with air even when the gas adsorbent is handled in the air, and it is possible to adsorb a large amount of the gas which needs to be adsorbed.

In addition, the joining layer is further provided and the joining layer may be configured to join the aeration member and the container so as completely cover the space.

In this configuration, using the joining layer, it is possible to realize the gas-adsorbing device in which it is possible to further reduce the consumption of the gas adsorbent due to the contact with air even when the gas adsorbent is handled in the air, and it is possible to adsorb a large amount of the gas which needs to be adsorbed.

In addition, a configuration, in which the aeration rate of the aeration member is 0.01 cc/min to 10 cc/min under the pressure difference of 1 atm, may be employed.

In this configuration, it is possible to reduce the adsorption capacity by adsorbing the gas at the atmospheric pressure, and it is possible to obtain an appropriate adsorption rate when the gas-adsorbing device is disposed in the space having the gas as the adsorption target.

In other words, the adsorption rate of the gas-adsorbing device is proportional to a product of the pressure difference between the inside and the outside of the space formed by the container and the aeration member, and the aeration rate of the aeration member. Hence, when the gas-adsorbing device is handled at the atmospheric pressure, it is desirable that the aeration member has a low aeration rate, and thus it is desirable that the aeration rate 10 cc/min or lower under the pressure difference of 1 atm.

Conversely, when the gas-adsorbing device is disposed in the space having the gas as the adsorption target, it is desirable that the aeration member has a high aeration rate, and it is desirable that the aeration rate is 0.01 cc/min or higher under the pressure difference of 1 atm. Hence, in order to satisfy both of the conditions, the aeration rate is set to 0.01 cc/min to 10 cc/min under the pressure difference of 1 atm.

In addition, a configuration, in which the gas adsorbent is subjected to the heat treatment under the reduced pressure, thereby obtaining adsorption properties, and at least one of the melting point or the softening temperature of the container and the aeration member is higher than a temperature of the heat treatment of the gas adsorbent, may be employed.

In this configuration, even when the space formed by the container and the aeration member is filled with the gas adsorbent and then, the heat treatment is performed, the container and the aeration member are not deformed or melted. In addition, the aeration rate of the aeration member is not influenced by the heat treatment such that it is possible to obtain the gas-adsorbing device without changing the appropriately adjusted aeration rate.

In addition, the aeration member may be configured of the sintered body.

In this manner, the aeration member is made of the sintered body, thereby making it possible to easily adjust the aeration rate. In other words, in the sintering, an aggregate of powder of metal or an inorganic material is heated at a temperature lower than the melting point or about at the softening temperature, thereby deforming and joining so as to have a small surface area between the particles of the power, and then, a void between particles of the powder is reduced in size such that the powder forms a solid. Therefore, the appropriate adjustment of the sintering temperature makes it possible for the aeration properties of the sintered body as the aeration member to be easily and appropriately adjusted. As a result, it is possible to attain the gas-adsorbing device in which it is possible to reduce the consumption of the gas adsorbent due to contact with air, even when the gas-adsorbing device is handled in air, and it is possible to adsorb a large amount of the gas as the adsorption target.

In addition, the aeration member may be formed of a circular cylindrical member.

In this configuration, since the aeration member is the circular cylindrical member, it is possible to easily and appropriately adjust the aeration rate. In other words, the aeration rate of the aeration member formed of the member having the circular cylindrical shape is proportional to the diameter and is inversely proportional to the length of the member. Hence, at least one of the diameter or the length is appropriately adjusted, thereby making it possible to easily obtain a target aeration rate.

In addition, the container and the aeration member may be configured to be joined by the thermoplastic joining layer.

In this manner, the thermoplastic joining material is used, thereby making possible to realize a mechanism in which sealing can be automatically performed under the reduced pressure. For example, since the thermoplastic joining material obtains flowability when heat is applied to the material, the joining material flows toward a lower side due to the gravity in a case where the material is disposed on a slope surface. Here, when a direction, in which the joining material flows, is a direction toward the joining position between the container and the aeration member, the joining material automatically flows in the joining position without an additional process from the outside. The material is cooled, thereby making it possible to join the joining positions and to seal the position.

In this configuration, after the gas adsorbent is subjected to the heat treatment under the reduced pressure, there is no need to handle the gas adsorbent in the atmosphere. Hence, it is possible to prevent an increase in the man-hours due to the difficulty in handling the gas adsorbent under the reduced pressure or in the inert gas. Further, it is possible to prevent the degradation by adsorbing impurity gas contained under the reduced pressure or in the inert gas, during the handling, and it is possible to attain the gas-adsorbing device at a low cost.

In addition, a configuration, in which at least one of that the melting point of the joining layer is lower than the melting point of the aeration member or that the softening temperature of the joining layer is lower than the softening temperature of the aeration member is satisfied, may be employed.

Thus, flowability is imparted to the joining material, thereby, making it possible to execute a process of causing the joining material to move to a joining position, without any influence on the aeration rate of the aeration member and without changing the appropriately adjusted aeration rate.

In addition, the joining layer may be configured of glass.

In this configuration, since the joining layer is glass, the heat treatment of activation of the gas adsorbent, as the copper ion-exchanged ZSM-5-type zeolite, exhibiting the adsorption properties by the heat treatment and the joining process between the container and the aeration member, which is performed by melting the joining layer as glass made of a thermal plastic material, are performed as substantially in the same process. Thus, it is possible to attain the gas-adsorbing device of which the cost is reduced.

In addition, the aeration member may be configured by an inorganic porous material.

In this manner, the aeration member is formed of the inorganic porous material, thereby making it possible to withstand the temperature of the heat treatment process of the gas adsorbent and the melting process of the joining layer. Further, the porous material of which at least one of the diameter or the length of the path, through which the gas passes, is appropriately adjusted, thereby making it possible to control the aeration rate. Thus, it is possible to attain the gas-adsorbing device in which a target period of time during which it is possible to be brought into contact with atmosphere.

In addition, at least a part of the front surface of the aeration member may be configured to be covered with the joining layer.

In this manner, since at least a part of the aeration member is covered with the joining layer, when the gas-adsorbing device is stored, it is possible to decrease the amount of the air reaching the gas adsorbent through the aeration member to the extent that the gas adsorbent material is insignificantly degraded.

Hence, it is possible to reduce the consumption of the gas adsorbent due to the contact with air, even when the gas-adsorbing device is handled in air, and it is possible to adsorb a large amount of the gas which needs to be adsorbed.

In addition, a configuration, in which the lid is further provided, the container and the lid, and the aeration member and the lid are joined with the joining layer, and the vicinities of the joining portion between the container and the lid, and the joining portion between the aeration member and the lid, respectively, slope toward the joining portion, may be employed.

According to such a configuration, since the vicinities of the container and the lid, and the aeration member and the lid, respectively, slope toward the joining portion, it is possible to satisfy contradictory properties to be described below.

In other words, after the member, which includes the gas adsorbent that can be handled in the atmosphere and is not subjected to the heat treatment of activation, is assembled in the atmosphere, the member is disposed in a vacuum heat treating apparatus in which the heat treatment can be performed during the pressure reduction. In order to perform a mechanical operation of the member disposed in the vacuum heat treating apparatus, an operational unit needs to be provided in the vacuum heat treating furnace. Therefore, this is advantageous in a technical or cost-reducing point of view. By contrast, the joining layer in a melting state needs to be positioned in the joining portion by any method. Since the lid, in which the joining layer is disposed, slopes, the joining layer in the melting state flows to the lower side due to the gravity. Therefore, the joining portion is positioned at a lower position in the vertical direction, thereby making it possible for the joining layer to be positioned in the joining portion without an additional mechanical operation.

In addition, a configuration, in which the shape of the cross section of the joining portions of the container and the lid, and the aeration member and the lid, respectively, have the V shape, may be employed.

In this configuration, since the shape of the cross section of the joining portions of the container and the lid, and the aeration member and the lid, respectively, have the V shape, the joining layer in the melting state efficiently flow in the joining portion. In other words, since the portion having the V shape has a small volume, it is possible to perform the joining with a small amount of the joining layer. Thus, it is possible to attain the gas-adsorbing device which is manufactured in a low cost.

In addition, the gas-adsorbing device may be configured by removing at least a part of the joining layer covering the aeration member.

Thus, it is possible to reliably ensure the aeration properties.

In this manner, at least a part of the joining layer covering the aeration member is removed, thereby, making it possible to solve the contradictory problems to be described below.

First, when the gas-adsorbing device is stored, the aeration member is covered with the joining layer having very little air permeability. Thus, it is possible to reduce an amount of air reaching the gas adsorbent through the aeration member. By contrast, when the gas-adsorbing device is used, the joining layer covering the aeration member is removed, thereby the gas reaches the gas adsorbent through the aeration member. Further, an area of the joining layer, which is removed, is appropriately adjusted, thereby it is possible to appropriately adjust the amount of the gas reaching the gas adsorbent through the aeration member.

In addition, the evacuated insulating material of the exemplary embodiment uses the gas-adsorbing device described above.

The gas-adsorbing device of the exemplary embodiment is used, thereby the remaining air which is not completely removed by the mechanical pump reaches the gas-adsorbing device through the aeration member and is adsorbed, and thus, the inner pressure of the evacuated insulating material is reduced, in the manufacturing process of the evacuated insulating material. Therefore, it is possible to improve the heat insulation performance of the evacuated insulating material.

Further, since the gas-adsorbing device of the exemplary embodiment is in a state of adsorbing the air through the aeration member when being applied to the evacuated insulating material, it is possible to reduce costs without a need of opening process of the gas-adsorbing device after the evacuated insulating material is manufactured.

INDUSTRIAL APPLICABILITY

As described above, according to the present invention, it is possible to achieve special effects that it is possible to reduce consumption of a gas adsorbent due to contact with air even when the gas adsorbent is handled in air, and the inside and the outside of a container do not need to communicate with each other after the gas-adsorbing device is applied to a space having a gas as an adsorption target. Accordingly, it is possible to remove impurity gas, air, and the like from an enclosed space, and it is possible to realize a space in a state in which the impurity gas is removed in high purity, and a space in a high-vacuum state. The present invention is applicable in that it is possible to be utilized for a use or the like in which there is a need to realize a high-vacuum state in a sealed space such as a plasma display panel and glove box, then to guide a specific gas, and to reduce concentration of the impurity gas.

REFERENCE MARKS IN THE DRAWINGS 1 gas-adsorbing device
2 container
2a opening
2b bottom portion
3 gas adsorbent
4 aeration member
11 gas-adsorbing device
12 container
12a first portion
12b second portion
12c step portion
12d bottom portion
12f opening
13 gas adsorbent
14 aeration member
15 joining material
21 gas-adsorbing device
22 container
22a first portion
22b second portion
22c step portion
22d bottom portion
22f opening
23 gas adsorbent
24 aeration member
25 joining material
26 metal pipe
31 gas-adsorbing device
32 container
32a wall surface
33 gas adsorbent
34 aeration member
35a joining material
35b joining layer
36 lid
36a hole
36b slope portion
37 contact point
37a joining portion
38 contact point
38a joining portion
47 evacuated insulating material
48 core
49 jacket
101 gas-adsorbing device
102 container
102a opening
102b bottom portion
103 gas adsorbent
104 aeration member
105 flange
106 film

The invention claimed is:

1. A gas-adsorbing device comprising:
a container;
a gas adsorbent configured to be disposed inside the container so as to adsorb a gas;
an aeration member having a predetermined aeration rate;
a joining layer; and
a lid,
wherein the gas adsorbent is disposed in a space formed by the container and the aeration member,
the joining layer joins the container and the lid, the joining layer joins the aeration member and the lid, and
the lid includes:
a first peripheral portion in the vicinity of a first joining portion between the container and the lid is configured to be sloped toward the first joining portion, and
a second peripheral portion in the vicinity of a second joining portion between the aeration member and the lid is configured to be sloped toward the second joining portion.

2. The gas-adsorbing device according to claim 1,
wherein the joining layer is configured to join the aeration member and the container to each other and to completely enclose the space.

3. The gas-adsorbing device according to claim 2,
wherein the joining layer has thermoplasticity.

4. The gas-adsorbing device according to claim 1,
wherein the aeration rate of the aeration member is at least 0.01 cc/min to at most 10 cc/min under a pressure difference of 1 atm.

5. The gas-adsorbing device according to claim 1,
wherein the gas adsorbent is subjected to a heat treatment under reduced pressure so as to obtain adsorption properties, and at least one of a melting point and a softening temperature of the container and the aeration member is higher than a temperature of the heat treatment of the gas adsorbent.

6. The gas-adsorbing device according to claim 1,
wherein the aeration member is formed of a sintered body.

7. The gas-adsorbing device according to claim 1,
wherein the aeration member is configured of a circular cylindrical member.

8. The gas-adsorbing device according to claim 1,
wherein a configuration, which satisfies at least one of (a) a melting point of the joining layer is lower than a melting point of the aeration member and (b) a softening temperature of the joining layer is lower than a softening temperature of the aeration member, is employed.

9. The gas-adsorbing device according to claim 1, wherein the aeration member is an inorganic porous material.

10. The gas-adsorbing device according to claim 1, wherein the aeration member is an organic porous material.

11. The gas-adsorbing device according to claim 1, wherein at least a part of a front surface of the aeration member is covered with the joining layer.

12. The gas-adsorbing device according to claim 1, wherein each of the first joining portion and the second joining portion has a V-shaped cross-section.

13. The gas-adsorbing device according to claim 1 wherein at least a part of the joining layer that covers the aeration member is configured to be removed when the gas-adsorbing devise is used.

14. An evacuated insulating material comprising: the gas-adsorbing device according to claim 1.

15. An evacuated insulating material comprising: the gas-adsorbing device according to claim 1.

* * * * *